US010338581B2

(12) United States Patent
Kuhara

(10) Patent No.: US 10,338,581 B2
(45) Date of Patent: Jul. 2, 2019

(54) UNMANNED AERIAL VEHICLE, FLIGHT CONTROL METHOD, NON-TRANSITORY COMPUTER-READABLE RECORDING MEDIUM, AND CONTROL DEVICE

(71) Applicant: Panasonic Intellectual Property Corporation of America, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 76 days.

(21) Appl. No.: 15/841,509

(22) Filed: Dec. 14, 2017

(65) Prior Publication Data
US 2018/0107213 A1 Apr. 19, 2018

Related U.S. Application Data

(63) Continuation of application No. PCT/JP2016/003253, filed on Jul. 8, 2016.
(Continued)

(30) Foreign Application Priority Data

Dec. 24, 2015 (JP) ................................ 2015-251467
Jun. 22, 2016 (JP) ................................ 2016-123693

(51) Int. Cl.
G05D 1/00 (2006.01)
B64C 39/02 (2006.01)
(Continued)

(52) U.S. Cl.
CPC ......... G05D 1/0055 (2013.01); B64C 39/024 (2013.01); B64D 47/08 (2013.01);
(Continued)

(58) Field of Classification Search
CPC .. G05D 1/0055; G05D 1/0033; G05D 1/0038; B64C 39/024; B64C 2201/146;
(Continued)

(56) References Cited

U.S. PATENT DOCUMENTS

2013/0038692 A1* 2/2013 Ohtomo ............... G05D 1/0016
348/46

FOREIGN PATENT DOCUMENTS

JP 2003-267295 9/2003

OTHER PUBLICATIONS

International Search Report of PCT application No. PCT/JP2016/003253 dated Sep. 20, 2016.

* cited by examiner

Primary Examiner — Aaron L Troost
(74) Attorney, Agent, or Firm — Greenblum & Bernstein, P.L.C.

(57) ABSTRACT

A controller in an unmanned aerial vehicle determines whether the unmanned aerial vehicle is beyond a visual range within which the unmanned aerial vehicle is visible to an operator. When the unmanned aerial vehicle is determined to be beyond the visual range, the controller determines whether the operator is controlling the unmanned aerial vehicle using the control device while viewing video on a head-mounted display. When the operator is determined to be controlling the unmanned aerial vehicle using the control device while viewing video on the head-mounted display, the controller controls flight of the unmanned aerial vehicle in accordance with control information for controlling the unmanned aerial vehicle. When the operator is determined not to be controlling the unmanned aerial vehicle using the control device while viewing video on the head-mounted display, the controller does not control flight of the
(Continued)

unmanned aerial vehicle in accordance with the control information.

11 Claims, 25 Drawing Sheets

Related U.S. Application Data

(60) Provisional application No. 62/201,782, filed on Aug. 6, 2015.

(51) Int. Cl.
*H04N 7/18* (2006.01)
*G08G 5/00* (2006.01)
*B64D 47/08* (2006.01)

(52) U.S. Cl.
CPC ......... *G05D 1/0033* (2013.01); *G05D 1/0038* (2013.01); *G08G 5/0013* (2013.01); *G08G 5/0069* (2013.01); *H04N 7/185* (2013.01); *B64C 2201/146* (2013.01)

(58) Field of Classification Search
CPC .... B64D 47/08; G08G 5/0013; G08G 5/0069; H04N 7/185
See application file for complete search history.

UNMANNED AERIAL VEHICLE, FLIGHT CONTROL METHOD, NON-TRANSITORY COMPUTER-READABLE RECORDING MEDIUM, AND CONTROL DEVICE

BACKGROUND

1. Technical Field

The present disclosure relates to an unmanned aerial vehicle to be remotely controlled, a flight control method for controlling the flight of the unmanned aerial vehicle, a non-transitory computer-readable recording medium storing a program for controlling the flight of the unmanned aerial vehicle, and a control device used to remotely control the unmanned aerial vehicle.

2. Description of the Related Art

Small unmanned aerial vehicles to be remotely controlled using remote controllers have been growing in popularity in recent years. Such an unmanned aerial vehicle includes a plurality of propellers and is capable of flying everywhere through the air by controlling the respective revolutions per minute (RPMs) of the plurality of propellers.

As described above, since unmanned aerial vehicles can fly everywhere through the air, various regulations on the flight of unmanned aerial vehicles are under development. One of the regulations under development is that, for example, the flight of unmanned aerial vehicles is restricted within the visual range of operators over which the unmanned aerial vehicles are visible to the operators.

There is a technology that allows an operator to remotely control an unmanned aerial vehicle out of the visual range of the operator while viewing images captured in real time using an onboard camera of the unmanned aerial vehicle (see, for example, Japanese Unexamined Patent Application Publication No. 2003-267295).

However, the technology of the related art described above needs to be further improved.

SUMMARY

In one general aspect, the techniques disclosed here feature an unmanned aerial vehicle including a camera, a communicator, a controller, and a position measurer. The camera captures video viewed from the unmanned aerial vehicle. The communicator communicates with a control device used to remotely control the unmanned aerial vehicle. The position measurer acquires a current position of the unmanned aerial vehicle. The controller performs operations including calculating a distance from the unmanned aerial vehicle to the control device; determining whether the unmanned aerial vehicle is beyond a visual range within which the unmanned aerial vehicle is visible to an operator on the basis of the calculated distance; when it is determined that the unmanned aerial vehicle is beyond the visual range, determining whether the operator is controlling the unmanned aerial vehicle by using the control device while viewing, on a display device, the video captured by the camera; controlling flight of the unmanned aerial vehicle in accordance with control information for controlling the unmanned aerial vehicle when it is determined that the operator is controlling the unmanned aerial vehicle by using the control device while viewing the video on the display device; and not controlling flight of the unmanned aerial vehicle in accordance with the control information when it is determined that the operator is not controlling the unmanned aerial vehicle by using the control device while viewing the video on the display device.

It should be noted that general or specific embodiments may be implemented as an apparatus, a device, a system, a method, an integrated circuit, a computer program, a recording medium such as a computer-readable compact disc read-only memory (CD-ROM), or any selective combination thereof.

According to an aspect of the present disclosure, when it is determined that the unmanned aerial vehicle is beyond the visual range and when it is determined that the operator is controlling the unmanned aerial vehicle by using the control device while viewing video displayed on a display device, the video being video transmitted from the unmanned aerial vehicle, the flight of the unmanned aerial vehicle is controlled in accordance with the control information, When it is determined that the unmanned aerial vehicle is beyond the visual range and when it is determined that the operator is not controlling the unmanned aerial vehicle by using the control device while viewing the video on the display device, the flight of the unmanned aerial vehicle is not controlled in accordance with the control information. Thus, when the unmanned aerial vehicle is being controlled by an operator through visual observation, it is possible to prevent continuous flight of the unmanned aerial vehicle beyond a visual range within which the unmanned aerial vehicle is visible to the operator.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
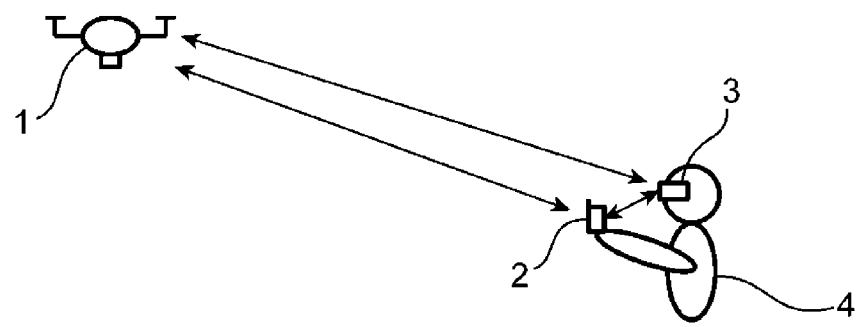
FIG. 1 is a schematic view of a flight control system according to a first embodiment of the present disclosure.

Underlying Knowledge Forming Basis of the Present Disclosure

As described above, since unmanned aerial vehicles can fly everywhere through the air, various regulations on the flight of unmanned aerial vehicles are under development. One of the regulations under development is that, for example, the flight of unmanned aerial vehicles is restricted within the visual range of operators over which the unmanned aerial vehicles are visible to the operators.

There is a technology that allows an operator to remotely control an unmanned aerial vehicle out of the visual range of the operator while viewing images captured in real time using an onboard camera of the unmanned aerial vehicle (see, for example, Japanese Unexamined Patent Application Publication No. 2003-267295).

For example, in a remote control system disclosed in Japanese Unexamined Patent Application Publication No. 2003-267295, an omnidirectional image viewed from the position of an unmanned helicopter is captured by an omnidirectional camera, the captured omnidirectional image is transmitted from a video transmitter, the transmitted omnidirectional image is received by a video receiver, a line-of-sight image of a scene in the direction of the line of sight of an operator that is detected by an angle sensor is cut off from the received omnidirectional image by a video cutter, video for controlling the unmanned helicopter is created based on the obtained line-of-sight image, and the created video is presented to the operator through a head-mounted display.

The series of operations described above allows the operator to easily and accurately control the unmanned helicopter if the unmanned helicopter is not directly visible to the operator.

In the remote control system disclosed in Japanese Unexamined Patent Application Publication No. 2003-267295, the unmanned helicopter is controlled by the operator who is always wearing the head-mounted display. Thus, when the unmanned aerial vehicle is being controlled by the operator through visual observation, it is difficult to prevent continuous flight of the unmanned aerial vehicle beyond a visual range within which the unmanned aerial vehicle is visible to the operator.

Accordingly, an unmanned aerial vehicle according to an aspect of the present disclosure includes a camera, a communicator, a controller, and a position measurer. The camera captures video viewed from the unmanned aerial vehicle. The communicator communicates with a control device used to remotely control the unmanned aerial vehicle. The position measurer acquires a current position of the unmanned aerial vehicle. The controller performs operations including calculating a distance from the unmanned aerial vehicle to the control device; determining whether the unmanned aerial vehicle is beyond a visual range within which the unmanned aerial vehicle is visible to an operator on the basis of the calculated distance; when it is determined that the unmanned aerial vehicle is beyond the visual range, determining whether the operator is controlling the unmanned aerial vehicle by using the control device while viewing, on a display device, the video captured by the camera; controlling flight of the unmanned aerial vehicle in accordance with control information for controlling the unmanned aerial vehicle when it is determined that the operator is controlling the unmanned aerial vehicle by using the control device while viewing the video on the display device; and not controlling flight of the unmanned aerial vehicle in accordance with the control information when it is determined that the operator is not controlling the unmanned aerial vehicle by using the control device while viewing the video on the display device.

With this configuration, the distance from the unmanned aerial vehicle to the control device is calculated. It is determined whether the unmanned aerial vehicle is beyond a visual range within which the unmanned aerial vehicle is visible to an operator on the basis of the calculated distance.

When it is determined that the unmanned aerial vehicle is beyond the visual range, it is determined whether the operator is controlling the unmanned aerial vehicle by using the control device while viewing video captured by the camera and displayed on a display device. When it is determined that the operator is controlling the unmanned aerial vehicle by using the control device while viewing the video on the display device, the flight of the unmanned aerial vehicle is controlled in accordance with control information for controlling the unmanned aerial vehicle. When it is determined that the operator is not controlling the unmanned aerial vehicle by using the control device while viewing the video on the display device, the flight of the unmanned aerial vehicle is not controlled in accordance with the control information.

Accordingly, when it is determined that the unmanned aerial vehicle is beyond the visual range and when it is determined that the operator is controlling the unmanned aerial vehicle by using the control device while viewing video transmitted from the unmanned aerial vehicle and displayed on a display device, the flight of the unmanned aerial vehicle is controlled in accordance with the control information. When it is determined that the unmanned aerial vehicle is beyond the visual range and when it is determined that the operator is not controlling the unmanned aerial vehicle by using the control device while viewing the video on the display device, the flight of the unmanned aerial vehicle is not controlled in accordance with the control information. Thus, when the unmanned aerial vehicle is being controlled by an operator through visual observation, it is possible to prevent continuous flight of the unmanned aerial vehicle beyond a visual range within which the unmanned aerial vehicle is visible to the operator.

In the unmanned aerial vehicle, the operations may further include notifying the operator that the unmanned aerial vehicle is flying beyond the visual range when it is determined that the operator is not controlling the unmanned aerial vehicle by using the control device while viewing the video on the display device.

With this configuration, when it is determined that the operator is not controlling the unmanned aerial vehicle by using the control device while viewing the video on the display device, the operator is notified that the unmanned aerial vehicle is flying beyond the visual range. Thus, the operator can be informed that the unmanned aerial vehicle is flying beyond the visual range and can control the unmanned aerial vehicle in such a manner that the unmanned aerial vehicle is kept within the visual range.

In the unmanned aerial vehicle, when the operator is controlling the unmanned aerial vehicle by using the control device while viewing the video on the display device, identification information indicating that the operator is controlling the unmanned aerial vehicle by using the control device while viewing the video on the display device may be added to the control information. The operations may further include determining whether the control information includes the identification information to determine whether the operator is controlling the unmanned aerial vehicle by using the control device while viewing the video on the display device.

With this configuration, when the operator is controlling the unmanned aerial vehicle by using the control device while viewing the video on the display device, identification information indicating that the operator is controlling the unmanned aerial vehicle by using the control device while viewing the video on the display device is added to the control information. It is determined whether the control information includes the identification information, thereby determining whether the operator is controlling the unmanned aerial vehicle by using the control device while viewing video displayed on the display device.

Thus, by checking whether the identification information is included in the control information, it is possible to easily determine whether the operator is controlling the unmanned aerial vehicle by using the control device while viewing the video on the display device.

In the unmanned aerial vehicle, the identification information may be added to the control information when a communication connection has been established between the control device and the display device.

With this configuration, the identification information is added to the control information when a communication connection has been established between the control device and the display device. Thus, when a communication connection has been established between the control device and the display device, the operator can be determined to be controlling the unmanned aerial vehicle by using the control device while viewing the video on the display device and can cause the unmanned aerial vehicle to fly even beyond the visual range.

In the unmanned aerial vehicle, the operations may further include, when it is determined that the control information includes the identification information, determining whether authorization information input by the operator is included in the control information; when the authorization information is included in the control information, acquiring authentication result information indicating a result of verification of whether the input authorization information is pre-authorization information pre-assigned to the operator if the operator is permitted to control the unmanned aerial vehicle by using the control device while viewing the video on the display device; controlling flight of the unmanned aerial vehicle in accordance with the control information when the acquired authentication result information indicates that the input authorization information is the pre-authorization information; and not controlling flight of the unmanned aerial vehicle in accordance with the control information when the authorization information is not included in the control information or when the acquired authentication result information indicates that the input authorization information is not the pre-authorization information.

With this configuration, if it is determined that the control information includes the identification information, it is determined whether authorization information input by the operator is included in the control information. If the authorization information is included in the control information, authentication result information indicating a result of verification of whether the input authorization information is pre-authorization information pre-assigned to the operator if the operator is permitted to control the unmanned aerial vehicle by using the control device while viewing the video on the display device is acquired. When the acquired authentication result information indicates that the input authorization information is the pre-authorization information, the flight of the unmanned aerial vehicle is controlled in accordance with the control information. If the authorization information is not included in the control information or when the acquired authentication result information indicates that the input authorization information is not the pre-authorization information, the flight of the unmanned aerial vehicle is not controlled in accordance with the control information.

Accordingly, if the operator is permitted to control the unmanned aerial vehicle by using the control device while viewing the video on the display device, the operator can control the unmanned aerial vehicle even beyond the visual range by using the control device while viewing the video on the display device.

In the unmanned aerial vehicle, the operations may further include, when it is determined that the unmanned aerial vehicle is beyond the visual range, transmitting, to the display device, video on which an image indicating a predetermined control instruction provided to the operator is superimposed; controlling flight of the unmanned aerial vehicle in accordance with the control information when the control information indicating a control result corresponding to the predetermined control instruction is received from the control device; and not controlling flight of the unmanned aerial vehicle in accordance with the control information when the control information indicating a control result corresponding to the predetermined control instruction is not received from the control device.

With this configuration, when it is determined that the unmanned aerial vehicle is beyond the visual range, video on which an image indicating a predetermined control instruction provided to the operator is superimposed is transmitted to the display device. When control information indicating a control result corresponding to the predetermined control instruction is received from the control device, the flight of the unmanned aerial vehicle is controlled in accordance with the control information. When control information indicating a control result corresponding to the predetermined control instruction is not received from the control device, the flight of the unmanned aerial vehicle is not controlled in accordance with the control information.

Accordingly, when the unmanned aerial vehicle is beyond the visual range, video on which an image indicating a predetermined control instruction provided to the operator is superimposed is displayed on the display device, and it is checked whether the operator is controlling the unmanned aerial vehicle in accordance with the displayed control instruction, thereby ensuring that it is determined whether the operator is controlling the unmanned aerial vehicle by using the control device while viewing the video on the display device. It is possible to prevent the unmanned aerial vehicle from being controlled beyond the visual range without using a display device.

A flight control method according to another aspect of the present disclosure includes receiving control information from a control device, the control information being information for controlling an unmanned aerial vehicle; calculating a distance from the unmanned aerial vehicle to the control device; determining whether the unmanned aerial vehicle is beyond a visual range within which the unmanned aerial vehicle is visible to an operator on the basis of the calculated distance; when it is determined that the unmanned aerial vehicle is beyond the visual range, determining whether the operator is controlling the unmanned aerial vehicle by using the control device while viewing video displayed on a display device, the video being video transmitted from the unmanned aerial vehicle; controlling flight of the unmanned aerial vehicle in accordance with the control information when it is determined that the operator is controlling the unmanned aerial vehicle by using the control device while viewing the video displayed on the display device; and not controlling flight of the unmanned aerial vehicle in accordance with the control information when it is determined that the operator is not controlling the unmanned aerial vehicle by using the control device while viewing the video displayed on the display device.

With this configuration, control information for controlling an unmanned aerial vehicle is received from a control device. The distance from the unmanned aerial vehicle to the control device is calculated. It is determined whether the unmanned aerial vehicle is beyond a visual range within which the unmanned aerial vehicle is visible to an operator on the basis of the calculated distance. When it is determined that the unmanned aerial vehicle is beyond the visual range, it is determined whether the operator is controlling the unmanned aerial vehicle by using the control device while viewing video transmitted from the unmanned aerial vehicle and displayed on a display device. When it is determined that the operator is controlling the unmanned aerial vehicle by using the control device while viewing the video on the display device, the flight of the unmanned aerial vehicle is controlled in accordance with the control information. When it is determined that the operator is not controlling the unmanned aerial vehicle by using the control device while viewing the video on the display device, the flight of the unmanned aerial vehicle is not controlled in accordance with the control information.

Accordingly, when it is determined that the unmanned aerial vehicle is beyond the visual range and when it is determined that the operator is controlling the unmanned aerial vehicle by using the control device while viewing video transmitted from the unmanned aerial vehicle and displayed on a display device, the flight of the unmanned aerial vehicle is controlled in accordance with the control information. When it is determined that the unmanned aerial vehicle is beyond the visual range and when it is determined that the operator is not controlling the unmanned aerial vehicle by using the control device while viewing the video on the display device, the flight of the unmanned aerial vehicle is not controlled in accordance with the control information. Thus, when the unmanned aerial vehicle is being controlled by an operator through visual observation, it is possible to prevent continuous flight of the unmanned aerial vehicle beyond a visual range within which the unmanned aerial vehicle is visible to the operator.

A non-transitory computer-readable recording medium according to still another aspect of the present disclosure is a non-transitory computer-readable recording medium storing a program that, when executed on a computer, causes the computer to perform a method. The method includes determining whether an unmanned aerial vehicle is beyond a visual range within which the unmanned aerial vehicle is visible to an operator on the basis of a distance from the unmanned aerial vehicle to a control device; when it is determined that the unmanned aerial vehicle is beyond the visual range, determining whether the operator is controlling the unmanned aerial vehicle by using the control device while viewing video displayed on a display device, the video being video transmitted from the unmanned aerial vehicle; controlling flight of the unmanned aerial vehicle in accordance with control information, the control information being information for controlling an unmanned aerial vehicle, when it is determined that the operator is controlling the unmanned aerial vehicle by using the control device while viewing the video displayed on the display device; and not controlling flight of the unmanned aerial vehicle in accordance with the control information when it is determined that the operator is not controlling the unmanned aerial vehicle by using the control device while viewing the video displayed on the display device.

With this configuration, control information for controlling an unmanned aerial vehicle is received from a control device. The distance from the unmanned aerial vehicle to the control device is calculated. It is determined whether the unmanned aerial vehicle is beyond a visual range within which the unmanned aerial vehicle is visible to an operator on the basis of the calculated distance. When it is determined that the unmanned aerial vehicle is beyond the visual range, it is determined whether the operator is controlling the unmanned aerial vehicle by using the control device while viewing video transmitted from the unmanned aerial vehicle and displayed on a display device. When it is determined that the operator is controlling the unmanned aerial vehicle by using the control device while viewing the video on the display device, the flight of the unmanned aerial vehicle is controlled in accordance with the control information. When it is determined that the operator is not controlling the unmanned aerial vehicle by using the control device while viewing the video on the display device, the flight of the unmanned aerial vehicle is not controlled in accordance with the control information.

Accordingly, when it is determined that the unmanned aerial vehicle is beyond the visual range and when it is determined that the operator is controlling the unmanned aerial vehicle by using the control device while viewing video transmitted from the unmanned aerial vehicle and displayed on a display device, the flight of the unmanned aerial vehicle is controlled in accordance with the control information. When it is determined that the unmanned aerial vehicle is beyond the visual range and when it is determined that the operator is not controlling the unmanned aerial vehicle by using the control device while viewing the video on the display device, the flight of the unmanned aerial vehicle is not controlled in accordance with the control information. Thus, when the unmanned aerial vehicle is being controlled by an operator through visual observation, it is possible to prevent continuous flight of the unmanned aerial vehicle beyond a visual range within which the unmanned aerial vehicle is visible to the operator.

A control device according to still another aspect of the present disclosure includes a communicator and a controller. The communicator communicates with an unmanned aerial vehicle. The controller controls an operation of the unmanned aerial vehicle. The controller performs operations including determining whether an operator is controlling the unmanned aerial vehicle by using the control device while viewing video displayed on a display device, the video being video transmitted from the unmanned aerial vehicle; and when it is determined that the operator is controlling the unmanned aerial vehicle by using the control device while viewing the video displayed on the display device, adding identification information to control information for controlling the unmanned aerial vehicle, the identification information being information indicating that the operator is controlling the unmanned aerial vehicle by using the control device while viewing the video displayed on the display device.

With this configuration, it is determined whether an operator is controlling an unmanned aerial vehicle by using a control device while viewing video transmitted from the unmanned aerial vehicle and displayed on a display device. When it is determined that the operator is controlling the unmanned aerial vehicle by using the control device while viewing the video on the display device, identification information indicating that the operator is controlling the unmanned aerial vehicle by using the control device while viewing the video on the display device is added to control information for controlling the unmanned aerial vehicle.

Accordingly, when it is determined that the operator is controlling the unmanned aerial vehicle by using the control device while viewing the video on the display device, identification information indicating that the operator is controlling the unmanned aerial vehicle by using the control device while viewing the video on the display device is added to the control information. Thus, by checking the presence of identification information, the unmanned aerial vehicle can easily determine whether the operator is controlling the unmanned aerial vehicle by using the control device while viewing the video on the display device. When the unmanned aerial vehicle is being controlled by an operator through visual observation, it is possible to prevent continuous flight of the unmanned aerial vehicle beyond a visual range within which the unmanned aerial vehicle is visible to the operator.

In the control device, the operations may further include receiving authorization information input by the operator; acquiring authentication result information indicating a result of verification of whether the input authorization information is pre-authorization information pre-assigned to the operator if the operator is permitted to control the unmanned aerial vehicle by using the control device while viewing the video displayed on the display device; and adding the identification information to the control information when the acquired authentication result information indicates that the input authorization information is the pre-authorization information.

With this configuration, authorization information input by the operator is received. Authentication result information indicating a result of verification of whether the input authorization information is pre-authorization information pre-assigned to the operator if the operator is permitted to control the unmanned aerial vehicle by using the control device while viewing the video on the display device is acquired. When the acquired authentication result information indicates that the input authorization information is the pre-authorization information, the identification information is added to the control information.

Accordingly, if the operator is permitted to control the unmanned aerial vehicle by using the control device while viewing the video on the display device, the operator can control the unmanned aerial vehicle even beyond the visual range by using the control device while viewing the video on the display device.

In the control device, the operations may further include, when it is determined that the control information includes the identification information, determining whether the video is being transmitted from the unmanned aerial vehicle to the display device; controlling flight of the unmanned aerial vehicle in accordance with the control information when it is determined that the video is being transmitted from the unmanned aerial vehicle to the display device; and not controlling flight of the unmanned aerial vehicle in accordance with the control information when it is determined that the video is not being transmitted from the unmanned aerial vehicle to the display device.

With this configuration, if it is determined that the control information includes the identification information, it is determined whether video is being transmitted from the unmanned aerial vehicle to the display device. When it is determined that video is being transmitted from the unmanned aerial vehicle to the display device, the flight of the unmanned aerial vehicle is controlled in accordance with the control information. When video is not being transmitted from the unmanned aerial vehicle to the display device, the flight of the unmanned aerial vehicle is not controlled in accordance with the control information.

Accordingly, if video is being transmitted from the unmanned aerial vehicle to the display device, the operator can be determined to be controlling the unmanned aerial vehicle by using the control device while viewing the video on the display device and can cause the unmanned aerial vehicle to fly even beyond the visual range.

Embodiments of the present disclosure will be described hereinafter with reference to the accompanying drawings. The following embodiments are exemplary implementations of the present disclosure and are not intended to limit the technical scope of the present disclosure.

First Embodiment

Figure 2:
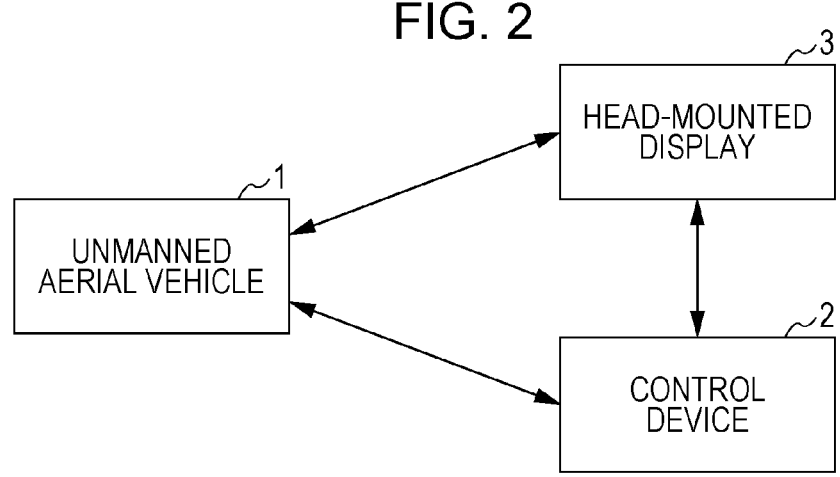
FIG. 2 is a block diagram illustrating the configuration of the flight control system according to the first embodiment of the present disclosure.

FIG. 1 is a schematic view of a flight control system according to a first embodiment of the present disclosure, and FIG. 2 is a block diagram illustrating the configuration of the flight control system according to the first embodiment of the present disclosure. The flight control system illustrated in FIG. 1 and FIG. 2 includes an unmanned aerial vehicle 1, a control device 2, and a head-mounted display 3.

The control device 2 is operated by an operator 4 to remotely control the unmanned aerial vehicle 1. The control device 2 transmits control information for controlling the unmanned aerial vehicle 1 to the unmanned aerial vehicle 1 wirelessly, for example.

The unmanned aerial vehicle 1 is remotely controlled by the operator 4 using the control device 2. The unmanned aerial vehicle 1 flies under remote control. The unmanned aerial vehicle 1 receives the control information from the control device 2 and flies on the basis of the received control information.

The head-mounted display 3 is mounted on the head of the operator 4 to display video transmitted from the unmanned aerial vehicle 1. The head-mounted display 3 displays video captured in first-person view. The head-mounted display 3 is an example of a display device. The operator 4 is able to control the unmanned aerial vehicle 1 either through visual observation or while viewing video displayed on the head-mounted display 3.

Figure 3:
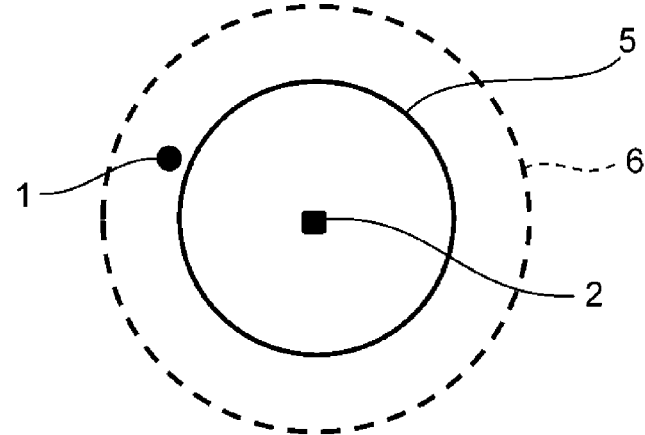
FIG. 3 is a schematic diagram illustrating a visual range according to the first embodiment within which an operator can control an unmanned aerial vehicle through visual observation.

FIG. 3 is a schematic diagram illustrating a visual range according to the first embodiment within which an operator can control an unmanned aerial vehicle through visual observation. A visual range 5 illustrated in FIG. 3 is a hemispherical range centered on the control device 2 and having a radius of a predetermined distance. The predetermined distance is, for example, 500 m.

A controllable range 6 illustrated in FIG. 3 is a range within which the unmanned aerial vehicle 1 is remotely controllable and within which wireless signals from the control device 2 can reach. The controllable range 6 is a hemispherical range centered on the control device 2 and having a radius of the distance up to which wireless signals from the control device 2 can reach.

The operator 4 controls the unmanned aerial vehicle 1 within the visual range 5 through visual observation. The operator 4 controls the unmanned aerial vehicle 1 out of the visual range 5 while wearing the head-mounted display 3. The operator 4 may control the unmanned aerial vehicle 1 within the visual range 5 while wearing the head-mounted display 3.

Figure 4:
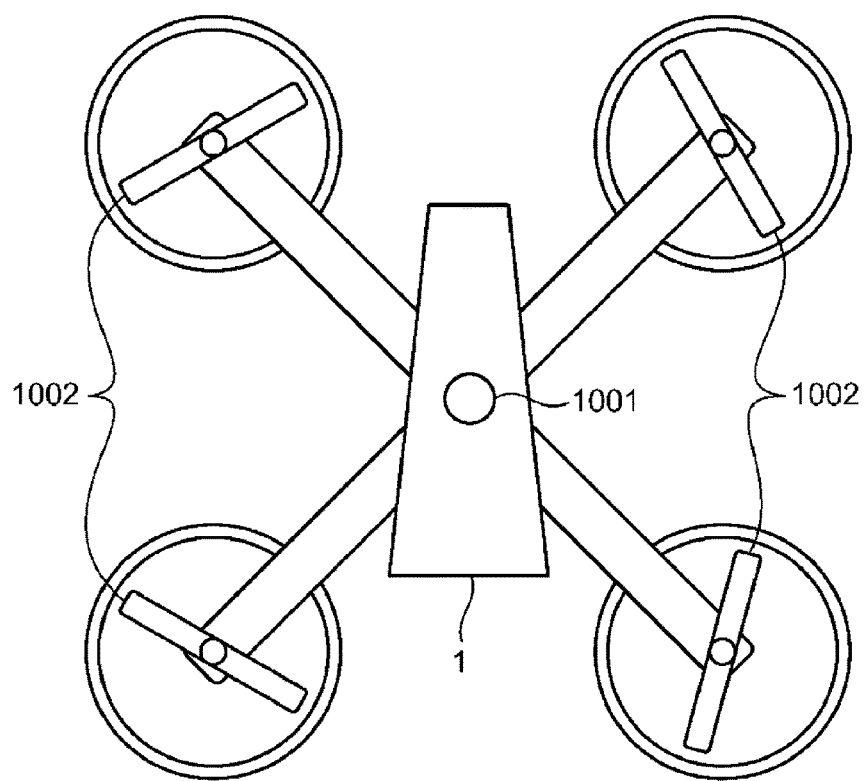
FIG. 4 is an overall view of an example of an unmanned aerial vehicle according to the first embodiment of the present disclosure.
Figure 5:
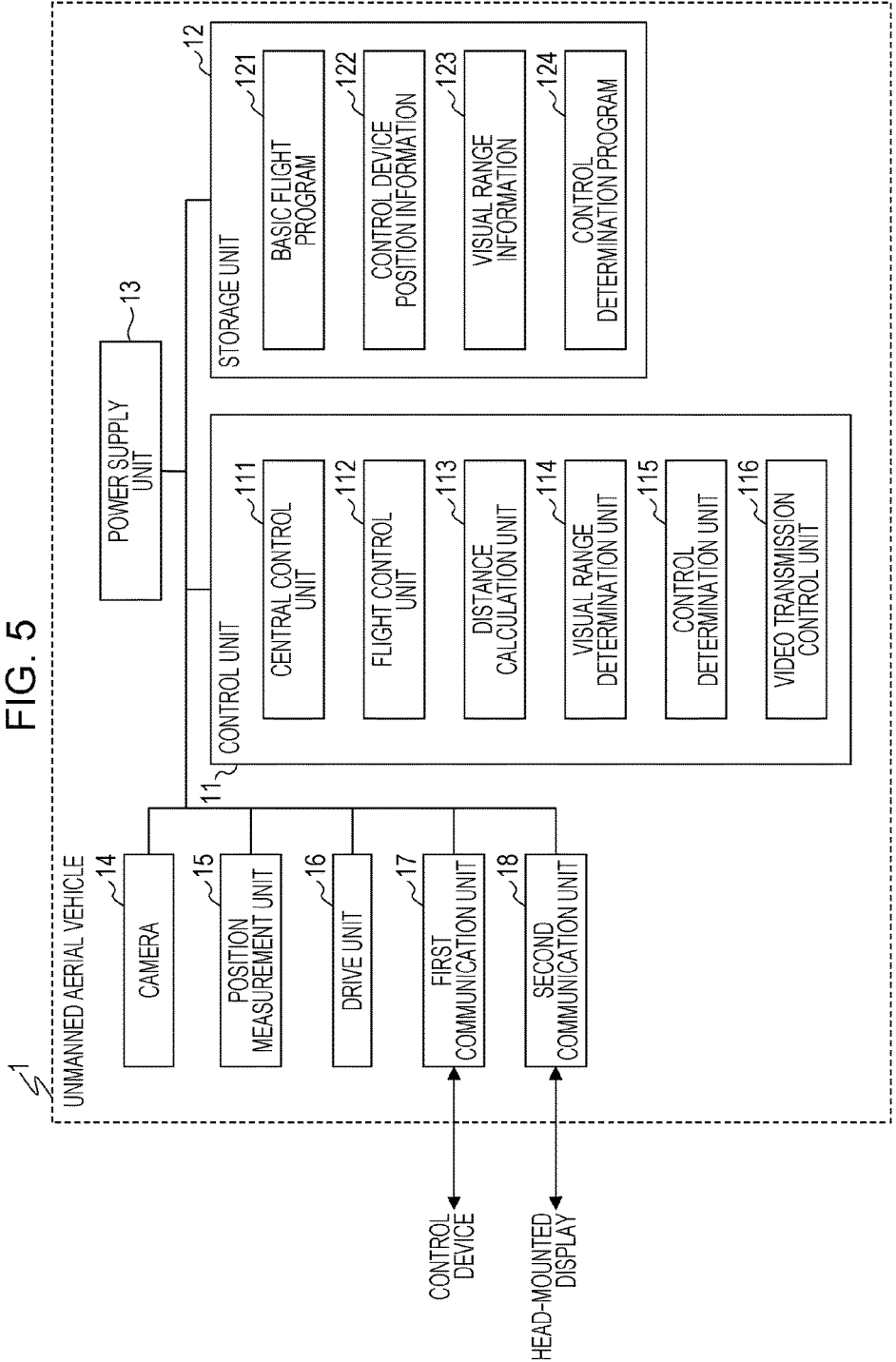
FIG. 5 is a block diagram illustrating the configuration of the unmanned aerial vehicle according to the first embodiment of the present disclosure.

FIG. 4 is an overall view of an example of the unmanned aerial vehicle 1 according to the first embodiment of the present disclosure. FIG. 5 is a block diagram illustrating the configuration of the unmanned aerial vehicle 1 according to the first embodiment of the present disclosure.

As illustrated in FIG. 4, the unmanned aerial vehicle 1 at least includes various sensors 1001, one of which is illustrated in FIG. 4, and propulsive devices 1002. The unmanned aerial vehicle 1 has located therein a control unit 11, a storage unit 12, a power supply unit 13, a camera 14, a position measurement unit 15, a drive unit 16, a first communication unit 17, and a second communication unit 18.

The various sensors 1001 are each an image sensor or a motion sensor, for example, and are mounted as desired in accordance with the purpose for which the unmanned aerial vehicle 1 is to be used.

Each of the propulsive devices 1002 includes propellers for producing the lift, thrust, and torque to sustain the flight of the unmanned aerial vehicle 1, and a motor for causing the propellers to rotate. In the example illustrated in FIG. 4, the unmanned aerial vehicle 1 includes four propulsive devices 1002. Alternatively, the unmanned aerial vehicle 1 may include, for example, five or more propulsive devices 1002.

The unmanned aerial vehicle 1 illustrated in FIG. 5 includes the control unit 11, the storage unit 12, the power supply unit 13, the camera 14, the position measurement unit 15, the drive unit 16, the first communication unit 17, and the second communication unit 18.

The power supply unit 13 is a power source for the unmanned aerial vehicle 1 and supplies electric power from a battery (not illustrated) included in the unmanned aerial vehicle 1 to each component of the unmanned aerial vehicle 1.

The camera 14 is attached to the unmanned aerial vehicle 1 and captures video viewed from the unmanned aerial vehicle 1. The camera 14 captures video of scenes in the direction of travel of the unmanned aerial vehicle 1 and outputs the captured video.

The position measurement unit 15 is, for example, a Global Positioning System (GPS) device and acquires the current position of the unmanned aerial vehicle 1. The current position of the unmanned aerial vehicle 1 is expressed in latitude, longitude, and altitude.

The drive unit 16 drives the plurality of propulsive devices 1002 to fly the unmanned aerial vehicle 1. The drive unit 16 rotates the plurality of propellers to fly the unmanned aerial vehicle 1.

The first communication unit 17 wirelessly transmits various types of information to the control device 2 and wirelessly receives various types of information from the control device 2. The first communication unit 17 receives control information for controlling the unmanned aerial vehicle 1 from the control device 2.

The second communication unit 18 wirelessly transmits various types of information to the head-mounted display 3 and wirelessly receives various types of information from the head-mounted display 3. The second communication unit 18 transmits the video captured by the camera 14 to the head-mounted display 3.

The control unit 11 is, for example, a central processing unit (CPU) and controls the operation of the unmanned aerial vehicle 1. The control unit 11 includes a central control unit 111, a flight control unit 112, a distance calculation unit 113, a visual range determination unit 114, a control determination unit 115, and a video transmission control unit 116.

The storage unit 12 is, for example, a semiconductor memory and stores various types of information. The storage unit 12 stores a basic flight program 121, control device position information 122, visual range information 123, and a control determination program 124.

The central control unit 111 controls the operation of each component of the unmanned aerial vehicle 1. The basic flight program 121 is a program for controlling the flight of the unmanned aerial vehicle 1. The flight control unit 112 executes the basic flight program 121 to control the flight of the unmanned aerial vehicle 1.

The distance calculation unit 113 calculates the distance from the unmanned aerial vehicle 1 to the control device 2. The control information transmitted from the control device 2 includes the control device position information 122 indicating the current position of the control device 2. The control device position information 122 is stored in the storage unit 12. The distance calculation unit 113 calculates the distance from the unmanned aerial vehicle 1 to the control device 2 on the basis of the current position of the unmanned aerial vehicle 1, which is measured by the position measurement unit 15, and the current position of the control device 2, which is stored in the storage unit 12.

The visual range determination unit 114 determines, based on the distance calculated by the distance calculation unit 113, whether the unmanned aerial vehicle 1 is beyond the visual range within which the unmanned aerial vehicle 1 is visible to the operator 4. The visual range information 123 is information indicating a predetermined visual range of the operator 4 and is stored in the storage unit 12 in advance.

If the unmanned aerial vehicle 1 is determined to be beyond the visual range, the control determination unit 115 determines whether the operator 4 is controlling the unmanned aerial vehicle 1 by using the control device 2 while viewing the video transmitted from the unmanned aerial vehicle 1 and displayed on the head-mounted display 3.

The control determination program 124 is a program for determining, when the unmanned aerial vehicle 1 is determined to be beyond the visual range, whether the operator 4 is controlling the unmanned aerial vehicle 1 by using the control device 2 while viewing video displayed on the head-mounted display 3. The control determination unit 115 executes the control determination program 124 to determine whether the operator 4 is controlling the unmanned aerial vehicle 1 by using the control device 2 while viewing video displayed on the head-mounted display 3.

If it is determined that the operator 4 is controlling the unmanned aerial vehicle 1 by using the control device 2 while viewing video displayed on the head-mounted display 3, the flight control unit 112 controls the flight of the unmanned aerial vehicle 1 in accordance with the control information. If it is determined that the operator 4 is not controlling the unmanned aerial vehicle 1 by using the control device 2 while viewing video displayed on the head-mounted display 3, the flight control unit 112 does not control the flight of the unmanned aerial vehicle 1 in accordance with the control information. If it is determined that the operator 4 is not controlling the unmanned aerial vehicle 1 by using the control device 2 while viewing video displayed on the head-mounted display 3, the flight control unit 112 causes the unmanned aerial vehicle 1 to hover at the current position. If it is determined that the operator 4 is not controlling the unmanned aerial vehicle 1 by using the control device 2 while viewing video displayed on the head-mounted display 3, the flight control unit 112 may notify the operator 4 that the unmanned aerial vehicle 1 is flying beyond the visual range.

In the control device 2, if the operator 4 is controlling the unmanned aerial vehicle 1 by using the control device 2 while viewing video displayed on the head-mounted display 3, identification information indicating that the operator 4 is controlling the unmanned aerial vehicle 1 by using the control device 2 while viewing video displayed on the head-mounted display 3 is added to the control information. The control determination unit 115 determines whether the control information includes the identification information, thereby determining whether the operator 4 is controlling the unmanned aerial vehicle 1 by using the control device 2 while viewing video displayed on the head-mounted display 3.

The video transmission control unit 116 transmits the video captured by the camera 14 to the head-mounted display 3 via the second communication unit 18. The video transmission control unit 116 performs predetermined image processing on the video output from the camera 14. The video transmission control unit 116 transmits the video in real time by using, for example, the Real Time Streaming Protocol (RTSP).

Figure 6:
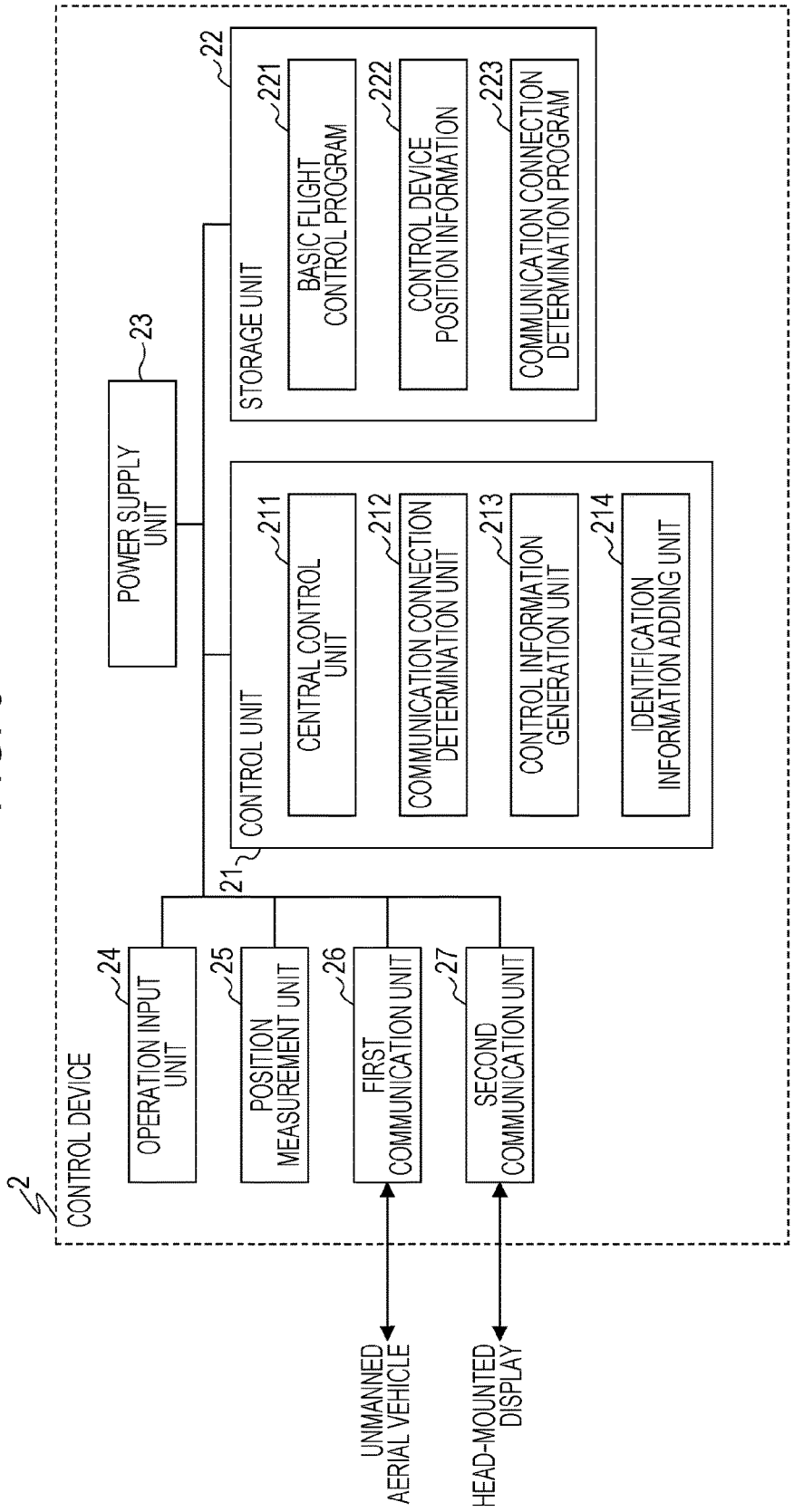
FIG. 6 is a block diagram illustrating the configuration of a control device according to the first embodiment of the present disclosure.

FIG. 6 is a block diagram illustrating the configuration of the control device 2 according to the first embodiment of the present disclosure. The control device 2 illustrated in FIG. 6 includes a control unit 21, a storage unit 22, a power supply unit 23, an operation input unit 24, a position measurement unit 25, a first communication unit 26, and a second communication unit 27.

The power supply unit 23 is a power source for the control device 2 and supplies electric power from a battery (not illustrated) included in the control device 2 to each component of the control device 2.

The operation input unit 24 receives an operation input from the operator 4. For example, the operation input unit 24 includes a left stick corresponding to the left hand of the operator 4, and a right stick corresponding to the right hand of the operator 4. In response to the tilting of the left stick and the right stick by the operator 4, the operation input unit 24 outputs angle information regarding the tilt angle to the control unit 21. The movement of the unmanned aerial vehicle 1 is controlled in accordance with the tilt angle. The control information includes, for example, angle information indicating the tilt angles of the left stick and the right stick.

The position measurement unit 25 is, for example, a GPS device and acquires the current position of the control device 2. The current position of the control device 2 is expressed in latitude, longitude, and altitude.

The first communication unit 26 wirelessly transmits various types of information to the unmanned aerial vehicle 1 and wirelessly receives various types of information from the unmanned aerial vehicle 1. The first communication unit 26 transmits the control information to the unmanned aerial vehicle 1.

The second communication unit 27 wirelessly transmits various types of information to the head-mounted display 3 and wirelessly receives various types of information from the head-mounted display 3.

The control unit 21 is, for example, a CPU and controls the operation of the control device 2. The control unit 21 includes a central control unit 211, a communication connection determination unit 212, a control information generation unit 213, and an identification information adding unit 214.

The storage unit 22 is, for example, a semiconductor memory and stores various types of information. The storage unit 22 stores a basic flight control program 221, control device position information 222, and a communication connection determination program 223.

The central control unit 211 controls the operation of each component of the control device 2. The basic flight control program 221 is a program for controlling the unmanned aerial vehicle 1. The central control unit 211 executes the basic flight control program 221 to control the unmanned aerial vehicle 1.

The central control unit 211 establishes a communication connection between the control device 2 and the head-mounted display 3 and pairs the control device 2 and the head-mounted display 3 with each other.

The communication connection determination unit 212 determines whether communication has been established between the control device 2 and the head-mounted display 3. The communication connection determination program 223 is a program for determining whether a communication connection has been established between the control device 2 and the head-mounted display 3. The communication connection determination unit 212 executes the communication connection determination program 223 to determine whether communication has been established between the control device 2 and the head-mounted display 3.

The control information generation unit 213 generates control information for controlling the unmanned aerial vehicle 1 in accordance with the operation input from the operation input unit 24. The control information generation unit 213 generates control information such that the control device position information 222 indicating the current position of the control device 2, which is stored in the storage unit 22, is included in the control information.

If a communication connection has been established between the control device 2 and the head-mounted display 3, the identification information adding unit 214 adds identification information to the control information. If the communication connection determination unit 212 determines that a communication connection has been established between the control device 2 and the head-mounted display 3, the identification information adding unit 214 adds identification information to the control information.

The storage unit 22 may store visual range information. In this case, the control device 2 can present the visual range information stored in the storage unit 22 to the operator 4, and the operator 4 can control the unmanned aerial vehicle 1 while checking the visual range and the current position of the unmanned aerial vehicle 1.

Figure 7:
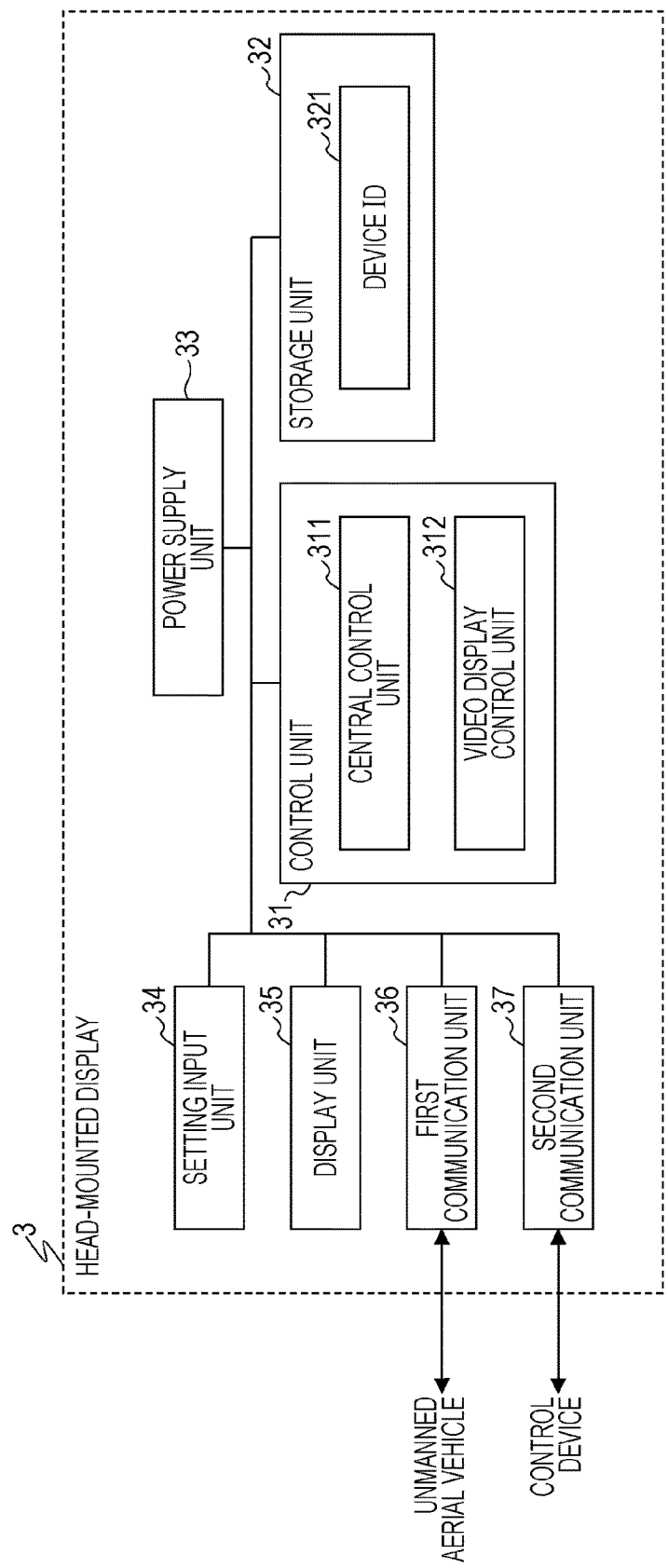
FIG. 7 is a block diagram illustrating the configuration of a head-mounted display according to the first embodiment of the present disclosure.

FIG. 7 is a block diagram illustrating the configuration of the head-mounted display 3 according to the first embodiment of the present disclosure. The head-mounted display 3 illustrated in FIG. 7 includes a control unit 31, a storage unit 32, a power supply unit 33, a setting input unit 34, a display unit 35, a first communication unit 36, and a second communication unit 37.

The power supply unit 33 is a power source for the head-mounted display 3 and supplies electric power from a battery (not illustrated) included in the head-mounted display 3 to each component of the head-mounted display 3.

The setting input unit 34 receives various settings input to the head-mounted display 3.

The display unit 35 displays video transmitted from the unmanned aerial vehicle 1.

The first communication unit 36 wirelessly transmits various types of information to the unmanned aerial vehicle 1 and wirelessly receives various types of information from the unmanned aerial vehicle 1. The first communication unit 36 receives video data transmitted from the unmanned aerial vehicle 1.

The second communication unit 37 wirelessly transmits various types of information to the control device 2 and wirelessly receives various types of information from the control device 2.

The control unit 31 is, for example, a CPU and controls the operation of the head-mounted display 3. The control unit 31 includes a central control unit 311 and a video display control unit 312. The storage unit 32 stores a device ID 321.

The central control unit 311 controls the operation of each component of the head-mounted display 3. The central control unit 311 establishes a communication connection between the head-mounted display 3 and the control device 2 and pairs the head-mounted display 3 and the control device 2 with each other.

The video display control unit 312 performs predetermined image processing on the video data received from the unmanned aerial vehicle 1 via the first communication unit 36. For example, the video display control unit 312 expands compressed video data and displays video on the display unit 35.

The device ID 321 is identification information for identifying the head-mounted display 3.

The head-mounted display 3 may include an angle sensor that detects the angle of the head of the operator 4 who is wearing the head-mounted display 3. The angle sensor detects the angle of the head of the operator 4 to detect the direction of the line of sight of the operator 4. For example, the angle sensor detects the angle (yaw angle) of the head in the horizontal direction (yaw axis direction) and the angle (pitch angle) of the head in the vertical direction (pitch axis direction), where the angle of the head of the operator whose head is oriented forward is defined as a reference angle (0 degrees). The second communication unit 37 transmits the angle detected by the angle sensor to the control device 2 as line-of-sight angle information. The control device 2 creates control information including the line-of-sight angle information transmitted from the head-mounted display 3 and transmits the control information to the unmanned aerial vehicle 1. The unmanned aerial vehicle 1 may include a camera drive unit that drives the camera 14 in the horizontal direction (yaw axis direction) and the vertical direction (pitch axis direction) to change the direction in which the camera 14 is pointing. The camera drive unit changes the direction in which the camera 14 is pointing on the basis of the line-of-sight angle information included in the control information transmitted from the control device 2. Accordingly, video of scenes in the direction of the line of sight of the operator 4 is displayed on the display unit 35 of the head-mounted display 3.

Next, an identification information adding process performed by the control device 2 to add identification information to control information in the first embodiment will be described.

Figure 8:
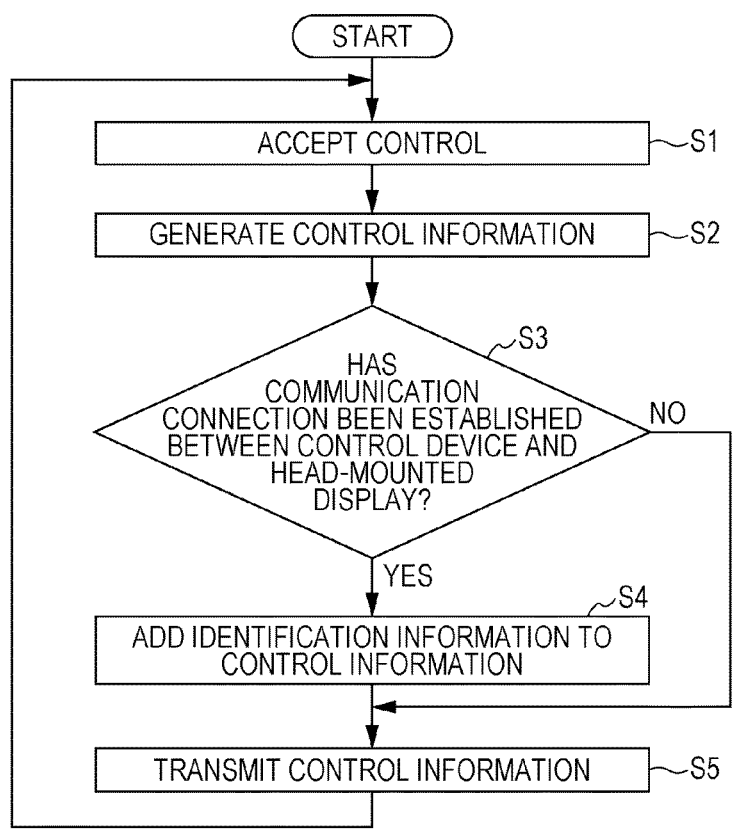
FIG. 8 is a flowchart illustrating an identification information adding process performed by a control device to add identification information to control information in the first embodiment.

FIG. 8 is a flowchart illustrating an identification information adding process performed by the control device 2 to add identification information to control information in the first embodiment.

First, in step S1, the operation input unit 24 accepts the control of the unmanned aerial vehicle 1 by the operator 4.

Then, in step S2, the control information generation unit 213 generates control information in accordance with the control by the operator 4, which has been accepted by the operation input unit 24. At this time, the control information generation unit 213 generates control information such that the control information includes the current position of the control device 2 measured by the position measurement unit 25.

Then, in step S3, the communication connection determination unit 212 determines whether a communication connection has been established between the control device 2 and the head-mounted display 3. For example, the second communication unit 27 of the control device 2 transmits a request signal for establishing a communication connection to the head-mounted display 3 and receives a response signal from the head-mounted display 3 in response to the request signal. Accordingly, a communication connection is established between the control device 2 and the head-mounted display 3. If it is determined that no communication connection has been established between the control device 2 and the head-mounted display 3 (NO in step S3), the process proceeds to step S5.

If it is determined that a communication connection has been established between the control device 2 and the head-mounted display 3 (YES in step S3), in step S4, the identification information adding unit 214 adds identification information to the control information generated by the control information generation unit 213. At this time, the identification information adding unit 214 adds identification information to the control information by setting a flag indicating that the operator 4 is controlling the unmanned aerial vehicle 1 by using the control device 2 while viewing video displayed on the head-mounted display 3. The flag is included in the control information.

The identification information adding unit 214 may receive a device ID from the head-mounted display 3 and add the received device ID to the control information as identification information. Alternatively, the identification information adding unit 214 may add identification information stored in the storage unit 22 to the control information.

Then, in step S5, the first communication unit 26 transmits the control information to the unmanned aerial vehicle 1. If it is determined that a communication connection has been established between the control device 2 and the head-mounted display 3, the first communication unit 26 transmits the control information including the identification information to the unmanned aerial vehicle 1. If it is determined that no communication connection has been established between the control device 2 and the head-mounted display 3, the first communication unit 26 transmits the control information including no identification information to the unmanned aerial vehicle 1.

Next, a process for controlling the flight of the unmanned aerial vehicle 1 according to the first embodiment will be described.

Figure 9:
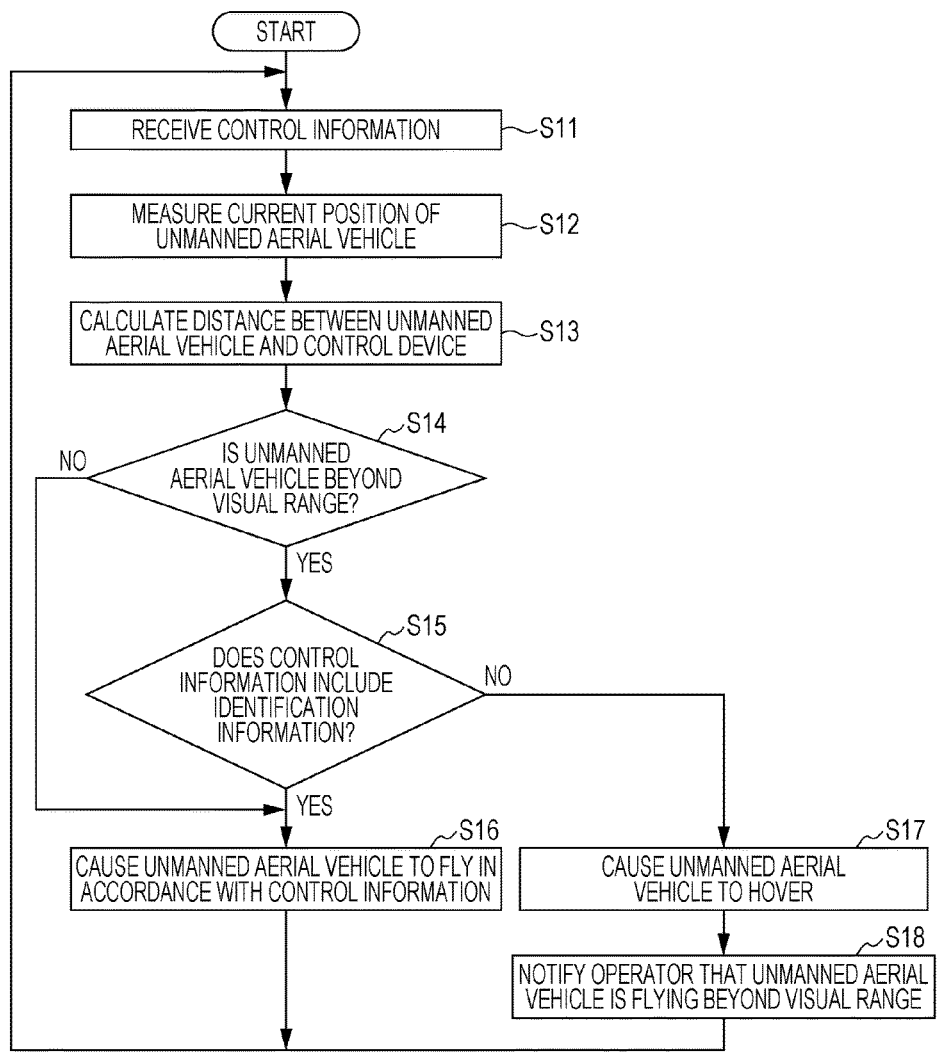
FIG. 9 is a flowchart illustrating a process for controlling the flight of an unmanned aerial vehicle according to the first embodiment.

FIG. 9 is a flowchart illustrating a process for controlling the flight of the unmanned aerial vehicle 1 according to the first embodiment.

First, in step S11, the first communication unit 17 receives control information transmitted from the control device 2.

Then, in step S12, the position measurement unit 15 measures the current position of the unmanned aerial vehicle 1.

Then, in step S13, the distance calculation unit 113 calculates the distance between the unmanned aerial vehicle 1 and the control device 2 on the basis of the current position of the unmanned aerial vehicle 1, which is measured by the position measurement unit 15, and the current position of the control device 2, which is included in the control information received by the first communication unit 17.

Then, in step S14, the visual range determination unit 114 determines whether the unmanned aerial vehicle 1 is beyond the visual range on the basis of the distance calculated by the distance calculation unit 113. The distance between the control device 2 and the outer boundary of the visual range is determined in advance. If the distance between the unmanned aerial vehicle 1 and the control device 2 is longer than the distance between the control device 2 and the outer boundary of the visual range, the visual range determination unit 114 determines that the unmanned aerial vehicle 1 is beyond the visual range. If the distance between the unmanned aerial vehicle 1 and the control device 2 is less than or equal to the distance between the control device 2 and the outer boundary of the visual range, the visual range determination unit 114 determines that the unmanned aerial vehicle 1 is not beyond the visual range.

If it is determined that the unmanned aerial vehicle 1 is beyond the visual range (YES in step S14), in step S15, the control determination unit 115 determines whether the control information received by the first communication unit 17 includes identification information indicating that the operator 4 is controlling the unmanned aerial vehicle 1 by using the control device 2 while viewing video displayed on the head-mounted display 3.

If it is determined that the control information includes the identification information (YES in step S15) or if it is determined that the unmanned aerial vehicle 1 is not beyond the visual range (NO in step S14), in step S16, the flight control unit 112 causes the unmanned aerial vehicle 1 to fly in accordance with the control information.

If it is determined that the control information does not include the identification information (NO in step S15), in step S17, the flight control unit 112 causes the unmanned aerial vehicle 1 to hover.

Then, in step S18, the flight control unit 112 notifies the operator 4 that the unmanned aerial vehicle 1 is flying beyond the visual range. Specifically, the flight control unit 112 transmits warning information to the control device 2 to indicate that the unmanned aerial vehicle 1 is flying beyond the visual range. Upon receipt of the warning information from the unmanned aerial vehicle 1, the control device 2 causes a warning light on the control device 2 to illuminate. The illumination of the warning light notifies the operator 4 who is controlling the unmanned aerial vehicle 1 through visual observation that the unmanned aerial vehicle 1 is flying beyond the visual range, thereby prompting the operator 4 to control the unmanned aerial vehicle 1 while wearing the head-mounted display 3. If the control device 2 includes a display unit, the display unit of the control device 2 may display that the unmanned aerial vehicle 1 is flying beyond the visual range. If the control device 2 includes a speaker, the speaker of the control device 2 may output audio indicating that the unmanned aerial vehicle 1 is flying beyond the visual range. Additionally, the flight control unit 112 may transmit the warning information to a pre-registered terminal device possessed by the operator 4. In this case, a display unit of the terminal device displays that the unmanned aerial vehicle 1 is flying beyond the visual range.

In this way, if it is determined that the unmanned aerial vehicle 1 is beyond the visual range and if it is determined that the operator 4 is controlling the unmanned aerial vehicle 1 by using the control device 2 while viewing video transmitted from the unmanned aerial vehicle 1 and displayed on the head-mounted display 3, the flight of the unmanned aerial vehicle 1 is controlled in accordance with the control information. If it is determined that the unmanned aerial vehicle 1 is beyond the visual range and if it is determined that the operator is not controlling the unmanned aerial vehicle 1 by using the control device 2 while viewing the video displayed on the head-mounted display 3, the flight of the unmanned aerial vehicle 1 is not controlled in accordance with the control information. Thus, when the unmanned aerial vehicle 1 is being controlled by the operator through visual observation, it is possible to prevent continuous flight of the unmanned aerial vehicle 1 beyond a visual range within which the unmanned aerial vehicle 1 is visible to the operator.

In the first embodiment, if it is determined that the operator 4 is not controlling the unmanned aerial vehicle 1 by using the control device 2 while viewing video displayed on the head-mounted display 3, the flight control unit 112 causes the unmanned aerial vehicle 1 to hover at the current position. However, the present disclosure is not limited to this operation. If it is determined that the operator 4 is not controlling the unmanned aerial vehicle 1 by using the control device 2 while viewing video displayed on the head-mounted display 3, the flight control unit 112 may cause the unmanned aerial vehicle 1 to automatically move toward the control device 2. Alternatively, if it is determined that the operator 4 is not controlling the unmanned aerial vehicle 1 by using the control device 2 while viewing video displayed on the head-mounted display 3, the flight control unit 112 may cause the unmanned aerial vehicle 1 to automatically move to enter the visual range. Alternatively, if it is determined that the operator 4 is not controlling the unmanned aerial vehicle 1 by using the control device 2 while viewing video displayed on the head-mounted display 3, the flight control unit 112 may cause the unmanned aerial vehicle 1 to land at the current position. If it is determined that the operator 4 is not controlling the unmanned aerial vehicle 1 by using the control device 2 while viewing video displayed on the head-mounted display 3, the flight control unit 112 may receive only control information for causing the unmanned aerial vehicle 1 to move toward the control device 2 or to move into the visual range.

Next, an identification information adding process according to a first modification of the first embodiment will be described. In the identification information adding process according to the first modification of the first embodiment, identification information is added to control information if the head-mounted display 3 is receiving video from the unmanned aerial vehicle 1.

Figure 10:
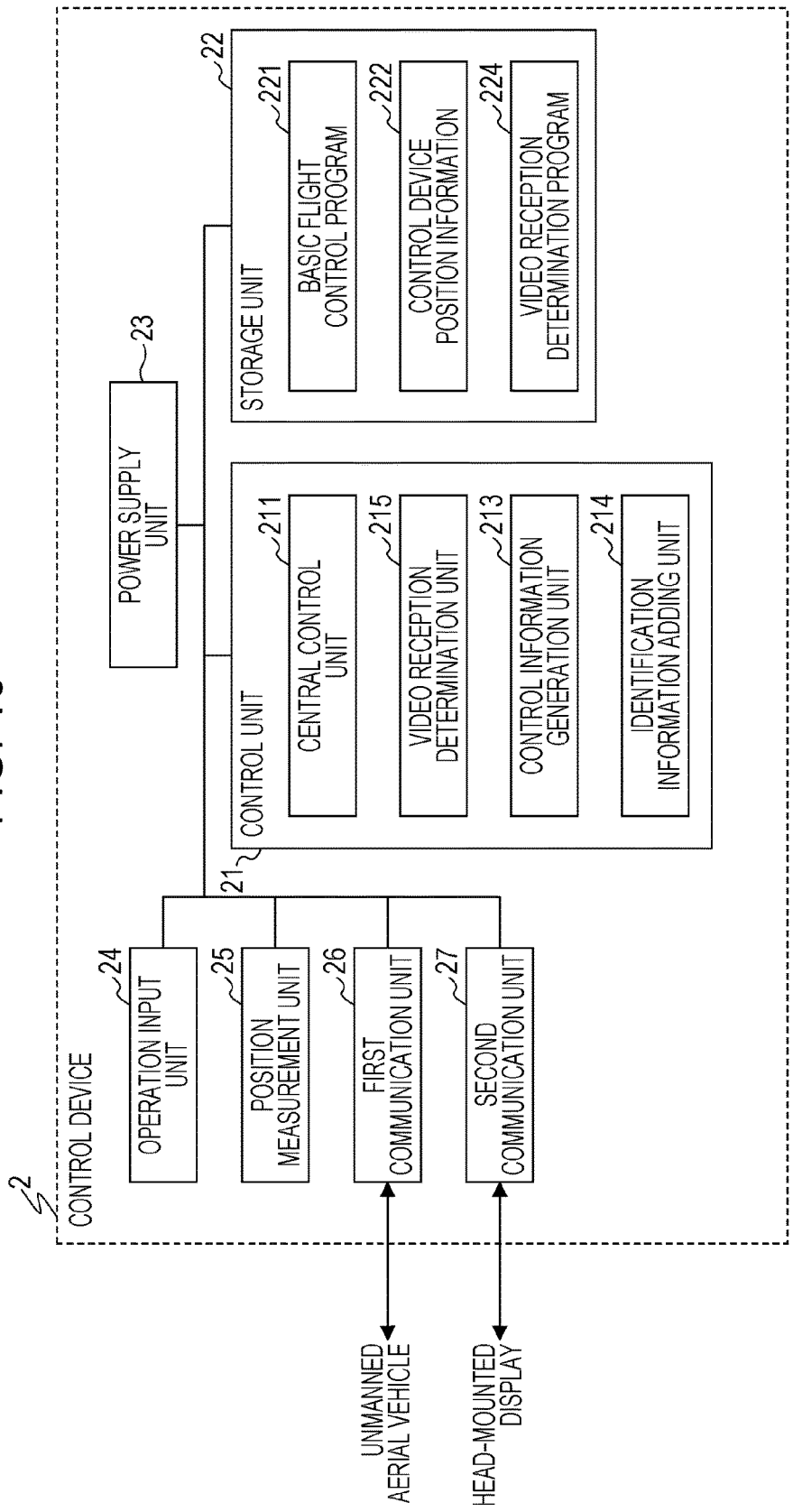
FIG. 10 is a block diagram illustrating the configuration of a control device according to a first modification of the first embodiment.

FIG. 10 is a block diagram illustrating the configuration of a control device 2 according to the first modification of the first embodiment. The control device 2 illustrated in FIG. 10 includes a control unit 21, a storage unit 22, a power supply unit 23, an operation input unit 24, a position measurement unit 25, a first communication unit 26, and a second communication unit 27. The control unit 21 includes a central control unit 211, a control information generation unit 213, an identification information adding unit 214, and a video reception determination unit 215. The storage unit 22 stores a basic flight control program 221, control device position information 222, and a video reception determination program 224.

In the control device 2 according to the first modification of the first embodiment illustrated in FIG. 10, substantially the same components as those of the control device 2 illustrated in FIG. 6 are identified with the same numerals and are not described herein. An unmanned aerial vehicle 1 and a head-mounted display 3 according to the first modification of the first embodiment have substantially the same configurations as the unmanned aerial vehicle 1 and the head-mounted display 3 illustrated in FIG. 5 and FIG. 7, respectively.

The video reception determination unit 215 determines whether the head-mounted display 3 is receiving video from the unmanned aerial vehicle 1. If the head-mounted display 3 is receiving video from the unmanned aerial vehicle 1, the identification information adding unit 214 adds identification information to the control information.

The video reception determination program 224 is a program for determining whether the head-mounted display 3 is receiving video from the unmanned aerial vehicle 1. The video reception determination unit 215 executes the video reception determination program 224 to determine whether the head-mounted display 3 is receiving video from the unmanned aerial vehicle 1.

Figure 11:
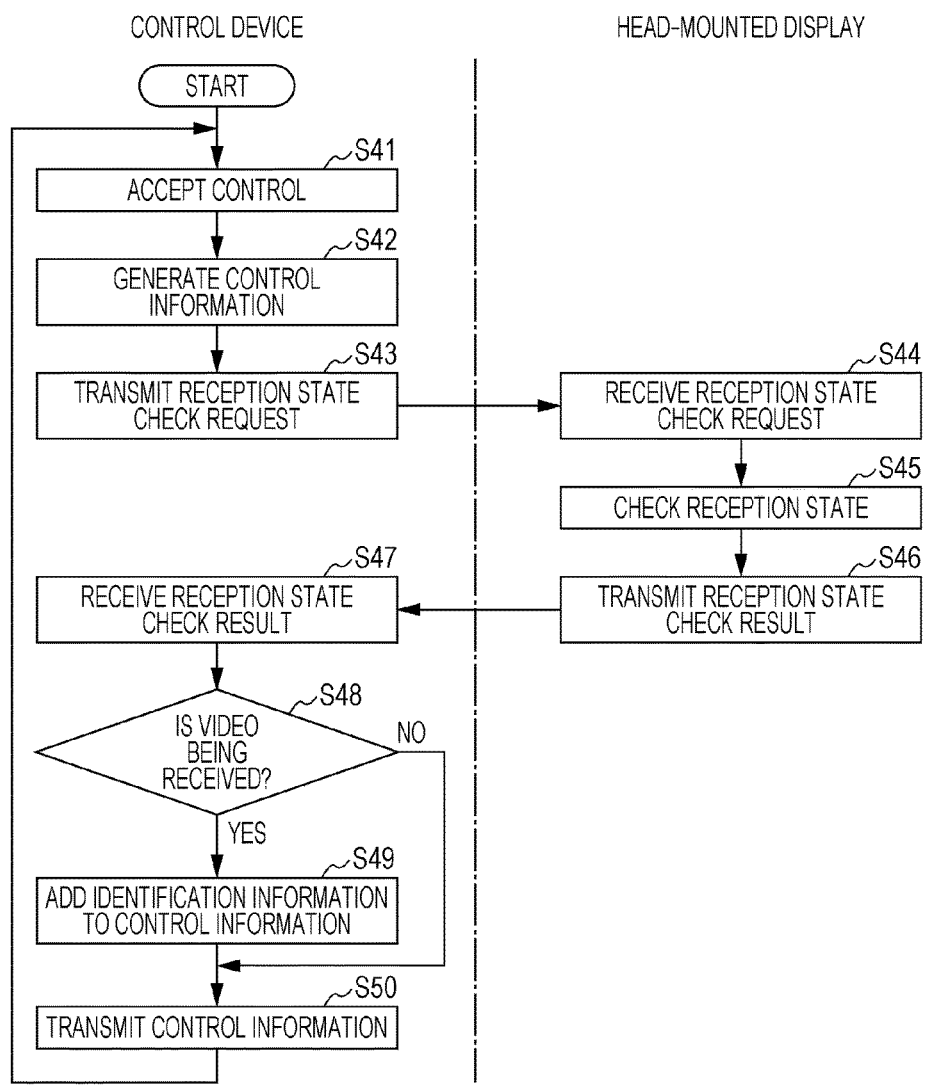
FIG. 11 is a flowchart illustrating an identification information adding process performed by a control device to add identification information to control information in the first modification of the first embodiment.

FIG. 11 is a flowchart illustrating an identification information adding process performed by the control device 2 to add identification information to control information in the first modification of the first embodiment.

First, in step S41, the operation input unit 24 accepts the control of the unmanned aerial vehicle 1 by the operator 4.

Then, in step S42, the control information generation unit 213 generates control information in accordance with the control by the operator 4, which has been accepted by the operation input unit 24.

Then, in step S43, the second communication unit 27 transmits a reception state check request to the head-mounted display 3 to check whether the head-mounted display 3 is receiving video from the unmanned aerial vehicle 1.

Then, in step S44, the second communication unit 37 of the head-mounted display 3 receives the reception state check request transmitted from the control device 2.

Then, in step S45, the central control unit 311 checks whether video is being received from the unmanned aerial vehicle 1. If video has been received without any communication error and if image processing has been successfully performed on video data received from the unmanned aerial vehicle 1, the central control unit 311 determines that video is being received from the unmanned aerial vehicle 1.

Then, in step S46, the second communication unit 37 transmits a reception state check result to the unmanned aerial vehicle 1 to indicate whether the head-mounted display 3 is receiving video from the unmanned aerial vehicle 1.

Then, in step S47, the second communication unit 27 of the control device 2 receives the reception state check result transmitted from the head-mounted display 3.

Then, in step S48, the video reception determination unit 215 determines whether the head-mounted display 3 is receiving video from the unmanned aerial vehicle 1 on the basis of the reception state check result received by the second communication unit 27. That is, if a reception state check result indicating that the head-mounted display 3 is receiving video from the unmanned aerial vehicle 1 is received, the video reception determination unit 215 determines that the head-mounted display 3 is receiving video from the unmanned aerial vehicle 1. If a reception state check result indicating that the head-mounted display 3 is not receiving video from the unmanned aerial vehicle 1 is received, the video reception determination unit 215 determines that the head-mounted display 3 is not receiving video from the unmanned aerial vehicle 1.

If it is determined that the head-mounted display 3 is not receiving video from the unmanned aerial vehicle 1 (NO in step S48), the process proceeds to step S50.

If it is determined that the head-mounted display 3 is receiving video from the unmanned aerial vehicle 1 (YES in step S48), in step S49, the identification information adding unit 214 adds identification information to the control information generated by the control information generation unit 213.

Then, in step S50, the first communication unit 26 transmits the control information to the unmanned aerial vehicle 1. If it is determined that the head-mounted display 3 is receiving video from the unmanned aerial vehicle 1, the first communication unit 26 transmits the control information including the identification information to the unmanned aerial vehicle 1. If it is determined that the head-mounted display 3 is not receiving video from the unmanned aerial vehicle 1, the first communication unit 26 transmits the control information including no identification information to the unmanned aerial vehicle 1.

In this way, it is possible to prevent the flight of the unmanned aerial vehicle 1 beyond the visual range when the head-mounted display 3 is not receiving video from the unmanned aerial vehicle 1.

Next, a flight control process according to a second modification of the first embodiment will be described. In the flight control process according to the second modification of the first embodiment, if the control information includes identification information and if video is being transmitted from the unmanned aerial vehicle 1 to the head-mounted display 3, the unmanned aerial vehicle 1 is allowed to fly beyond the visual range. Even in a case where the control information includes identification information, the unmanned aerial vehicle 1 is not allowed to fly beyond the visual range if video is not being transmitted from the unmanned aerial vehicle 1 to the head-mounted display 3.

Figure 12:
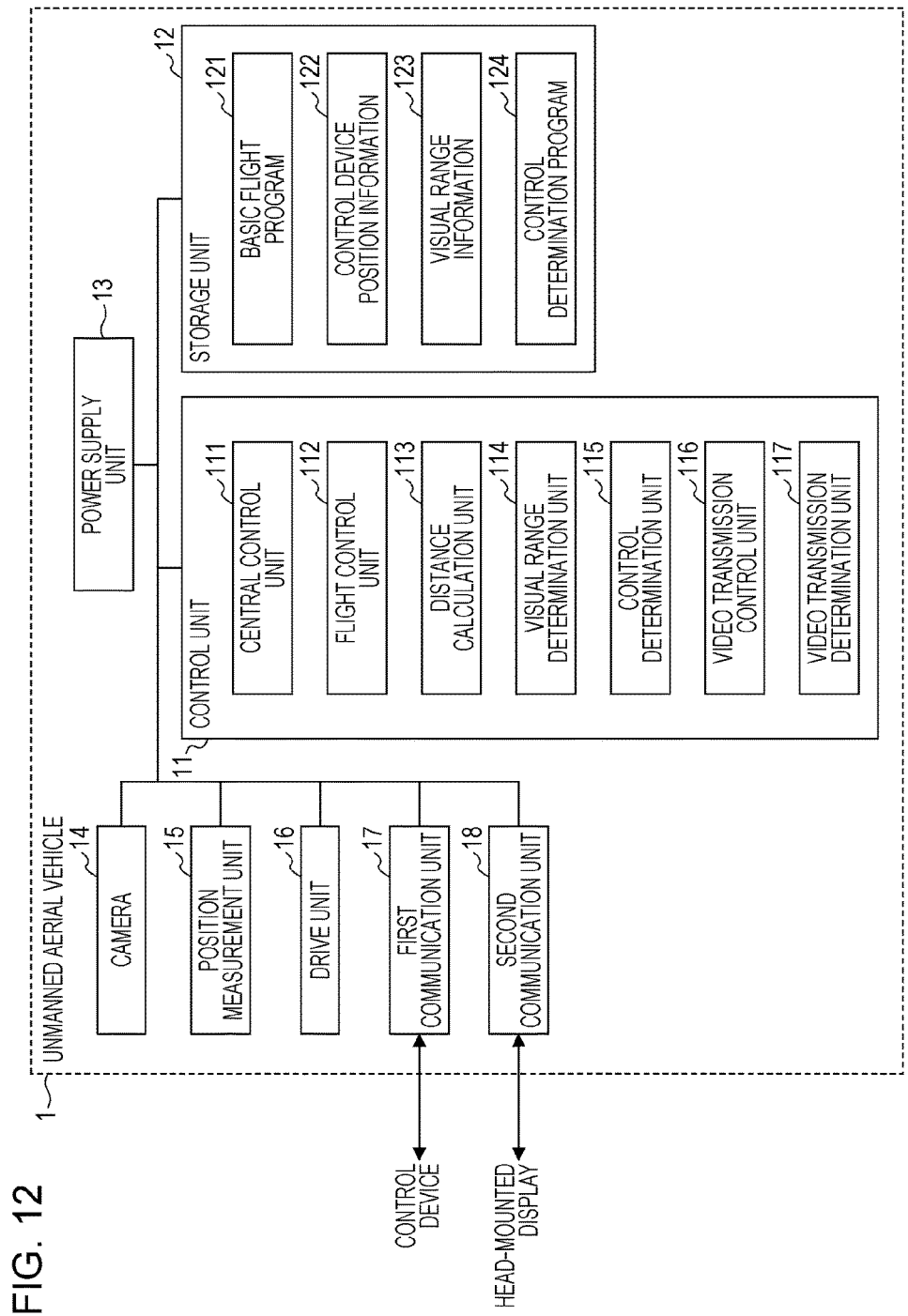
FIG. 12 is a block diagram illustrating the configuration of an unmanned aerial vehicle according to a second modification of the first embodiment.

FIG. 12 is a block diagram illustrating the configuration of an unmanned aerial vehicle 1 according to the second modification of the first embodiment. The unmanned aerial vehicle 1 illustrated in FIG. 12 includes a control unit 11, a storage unit 12, a power supply unit 13, a camera 14, a position measurement unit 15, a drive unit 16, a first communication unit 17, and a second communication unit 18. The control unit 11 includes a central control unit 111, a flight control unit 112, a distance calculation unit 113, a visual range determination unit 114, a control determination unit 115, a video transmission control unit 116, and a video transmission determination unit 117.

In the unmanned aerial vehicle 1 according to the second modification of the first embodiment illustrated in FIG. 12, substantially the same components as those of the unmanned aerial vehicle 1 illustrated in FIG. 5 are identified with the same numerals and are not described herein. A control device 2 and a head-mounted display 3 according to the second modification of the first embodiment have substantially the same configurations as the control device 2 and the head-mounted display 3 illustrated in FIG. 6 and FIG. 7, respectively.

If it is determined that the control information includes identification information, the video transmission determination unit 117 determines whether video is being transmitted from the unmanned aerial vehicle 1 to the head-mounted display 3. If it is determined that video is being transmitted from the unmanned aerial vehicle 1 to the head-mounted display 3, the flight control unit 112 controls the flight of the unmanned aerial vehicle 1 in accordance with the control information. If it is determined that video is not being transmitted from the unmanned aerial vehicle 1 to the head-mounted display 3, the flight control unit 112 does not control the flight of the unmanned aerial vehicle 1 in accordance with the control information.

Figure 13:
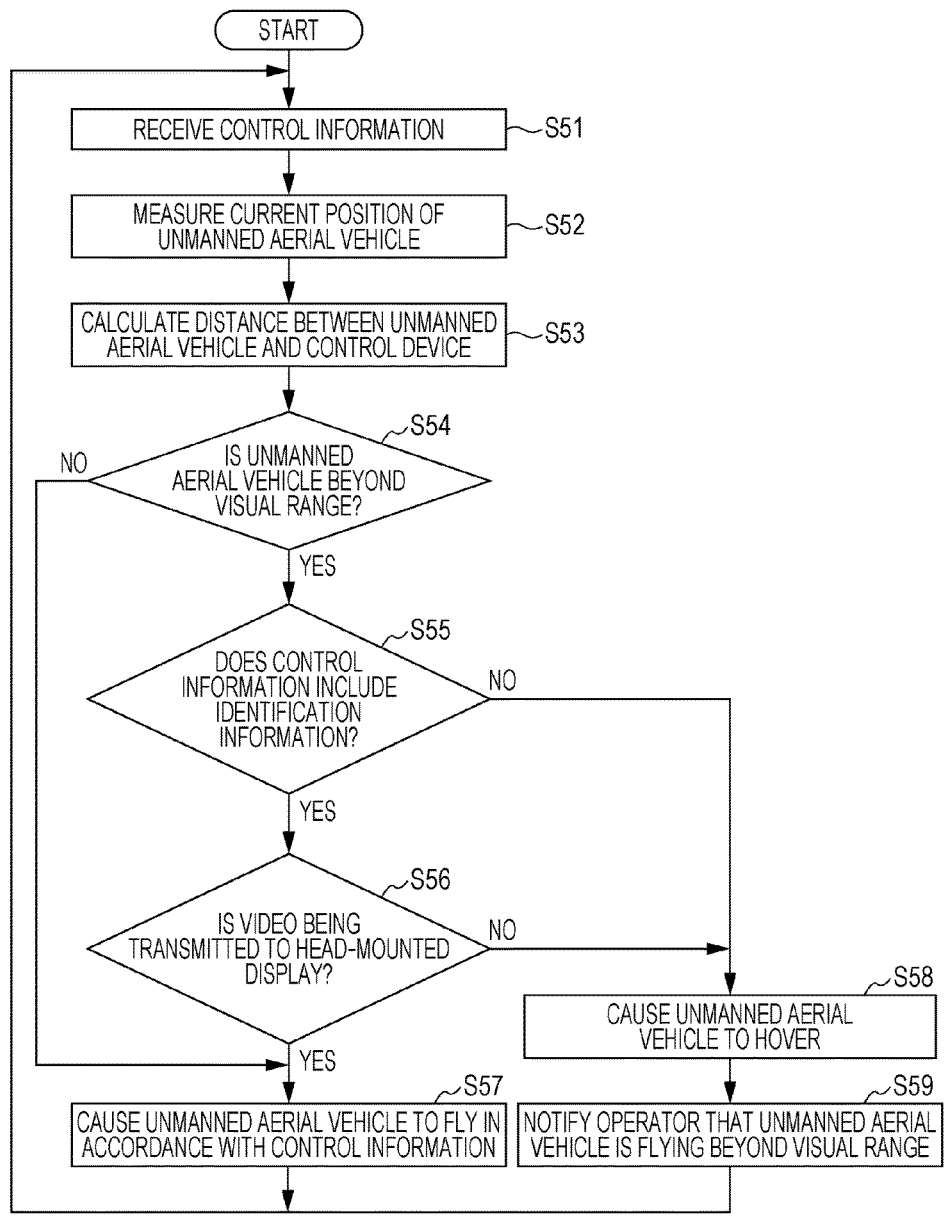
FIG. 13 is a flowchart illustrating a process for controlling the flight of an unmanned aerial vehicle according to the second modification of the first embodiment.

FIG. 13 is a flowchart illustrating a process for controlling the flight of the unmanned aerial vehicle 1 according to the second modification of the first embodiment.

The processing of steps S51 to S55 is substantially the same as the processing of steps S11 to S15 illustrated in FIG. 9 and is not described herein.

If it is determined that the control information includes identification information (YES in step S55), in step S56, the video transmission determination unit 117 determines whether video is being transmitted from the unmanned aerial vehicle 1 to the head-mounted display 3. If video is being transmitted without any communication error and if image processing has been successfully performed on video acquired from the camera 14, the video transmission determination unit 117 determines that video is being transmitted from the unmanned aerial vehicle 1 to the head-mounted display 3.

If it is determined that video is being transmitted from the unmanned aerial vehicle 1 to the head-mounted display 3 (YES in step S56) or if it is determined that the unmanned aerial vehicle 1 is not beyond the visual range (NO in step S54), in step S57, the flight control unit 112 causes the unmanned aerial vehicle 1 to fly in accordance with the control information.

If it is determined that video is not being transmitted from the unmanned aerial vehicle 1 to the head-mounted display 3 (NO in step S56) or if it is determined that the control information includes no identification information (NO in step S55), in step S58, the flight control unit 112 causes the unmanned aerial vehicle 1 to hover.

The processing of step S59 is substantially the same as the processing of step S18 illustrated in FIG. 9 and is not described herein.

In this way, it is possible to prevent the flight of the unmanned aerial vehicle 1 beyond the visual range when video is not being transmitted from the unmanned aerial vehicle 1 to the head-mounted display 3.

Next, an identification information adding process according to a third modification of the first embodiment will be described. In the identification information adding process according to the third modification of the first embodiment, identification information is added to control information if the eyes of the operator who is wearing the head-mounted display 3 are detected.

Figure 14:
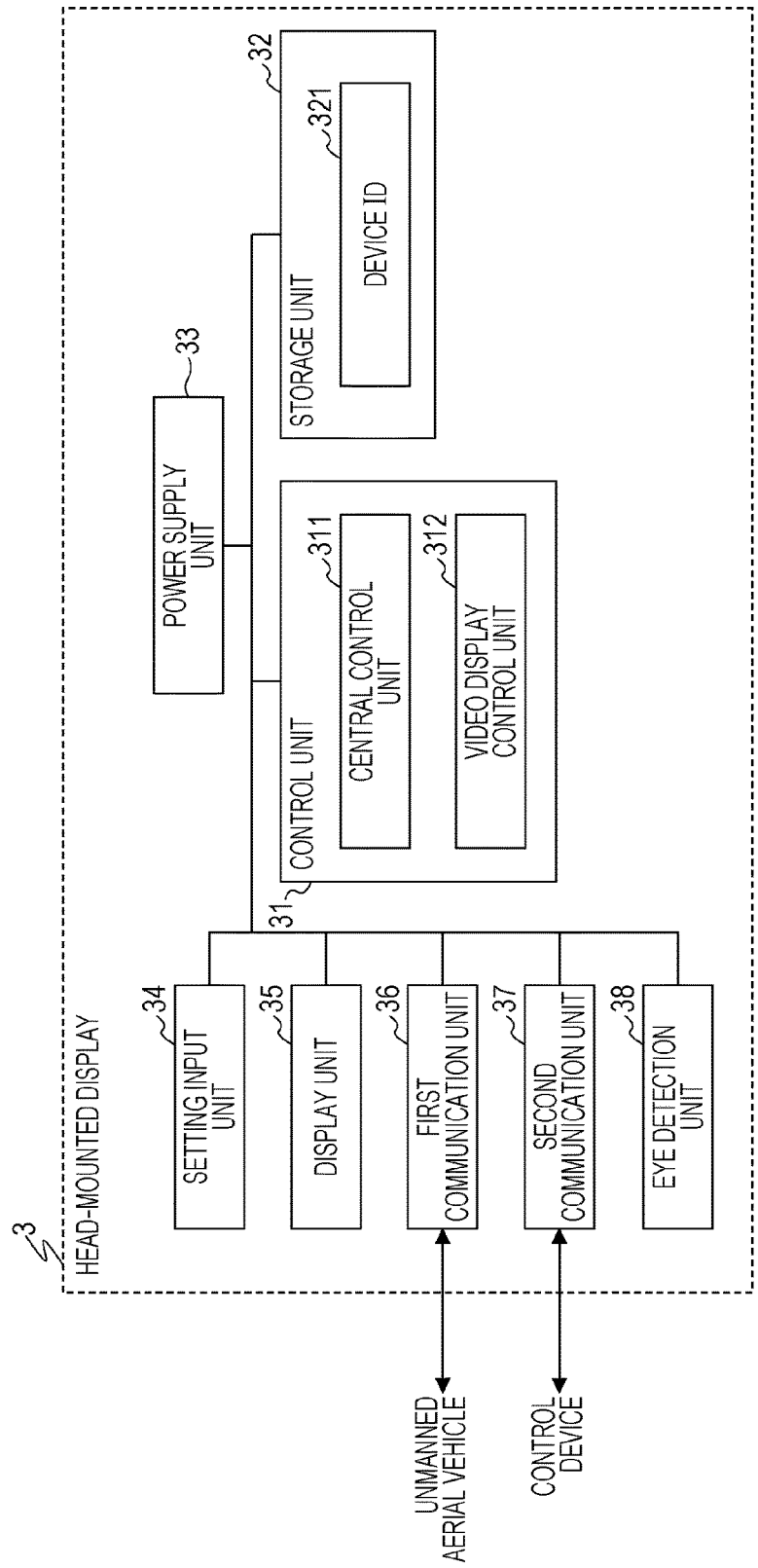
FIG. 14 is a block diagram illustrating the configuration of a head-mounted display according to a third modification of the first embodiment.

FIG. 14 is a block diagram illustrating the configuration of a head-mounted display 3 according to the third modification of the first embodiment. The head-mounted display 3 illustrated in FIG. 14 includes a control unit 31, a storage unit 32, a power supply unit 33, a setting input unit 34, a display unit 35, a first communication unit 36, a second communication unit 37, and an eye detection unit 38.

In the head-mounted display 3 according to the third modification of the first embodiment illustrated in FIG. 14, substantially the same components as those of the head-mounted display 3 illustrated in FIG. 7 are identified with the same numerals and are not described herein.

The eye detection unit 38 detects the eyes of the operator 4 who is wearing the head-mounted display 3. The eye detection unit 38 detects the eyes of the operator 4 who is wearing the head-mounted display 3 on the basis of an image captured by an infrared camera, for example. The eye detection unit 38 may not only detect the eyes of the operator 4 but also detect the direction of the line of sight of the operator 4 and detect the operator 4 viewing video displayed on the display unit 35.

Figure 15:
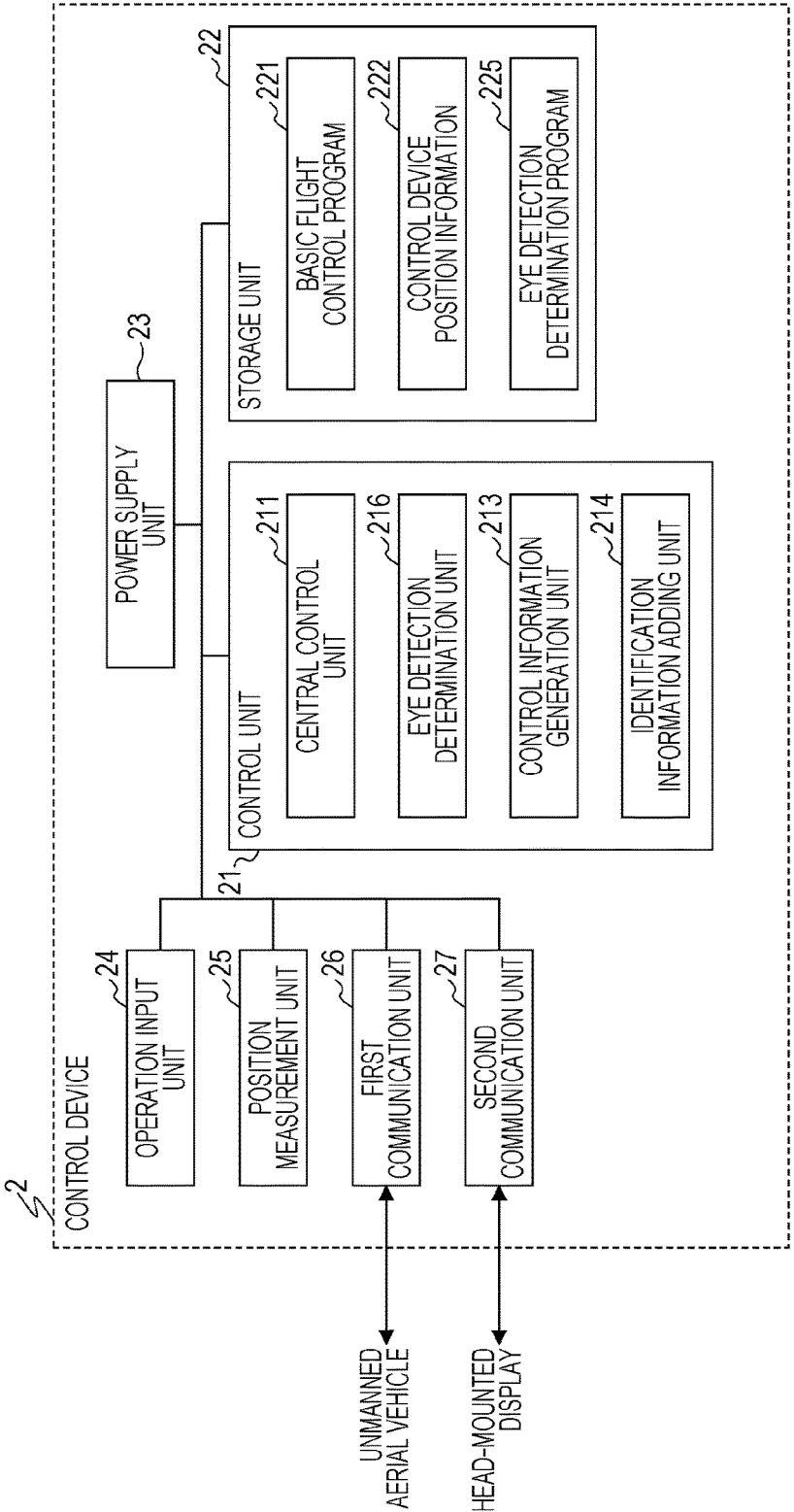
FIG. 15 is a block diagram illustrating the configuration of a control device according to the third modification of the first embodiment.

FIG. 15 is a block diagram illustrating the configuration of a control device 2 according to the third modification of the first embodiment. The control device 2 illustrated in FIG. 15 includes a control unit 21, a storage unit 22, a power supply unit 23, an operation input unit 24, a position measurement unit 25, a first communication unit 26, and a second communication unit 27. The control unit 21 includes a central control unit 211, a control information generation unit 213, an identification information adding unit 214, and an eye detection determination unit 216. The storage unit 22 stores a basic flight control program 221, control device position information 222, and an eye detection determination program 225.

In the control device 2 according to the third modification of the first embodiment illustrated in FIG. 15, substantially the same components as those of the control device 2 illustrated in FIG. 6 are identified with the same numerals and are not described herein. An unmanned aerial vehicle 1 according to the third modification of the first embodiment has substantially the same configuration as the unmanned aerial vehicle 1 illustrated in FIG. 5.

The eye detection determination unit 216 determines whether the eyes of the operator 4 have been detected in the head-mounted display 3. If the eyes of the operator 4 have been detected by the eye detection unit 38 of the head-mounted display 3, the identification information adding unit 214 adds identification information to the control information.

The eye detection determination program 225 is a program for determining whether the eyes of the operator 4 have been detected in the head-mounted display 3. The eye detection determination unit 216 executes the eye detection determination program 225 to determine whether the eyes of the operator 4 have been detected in the head-mounted display 3.

Figure 16:
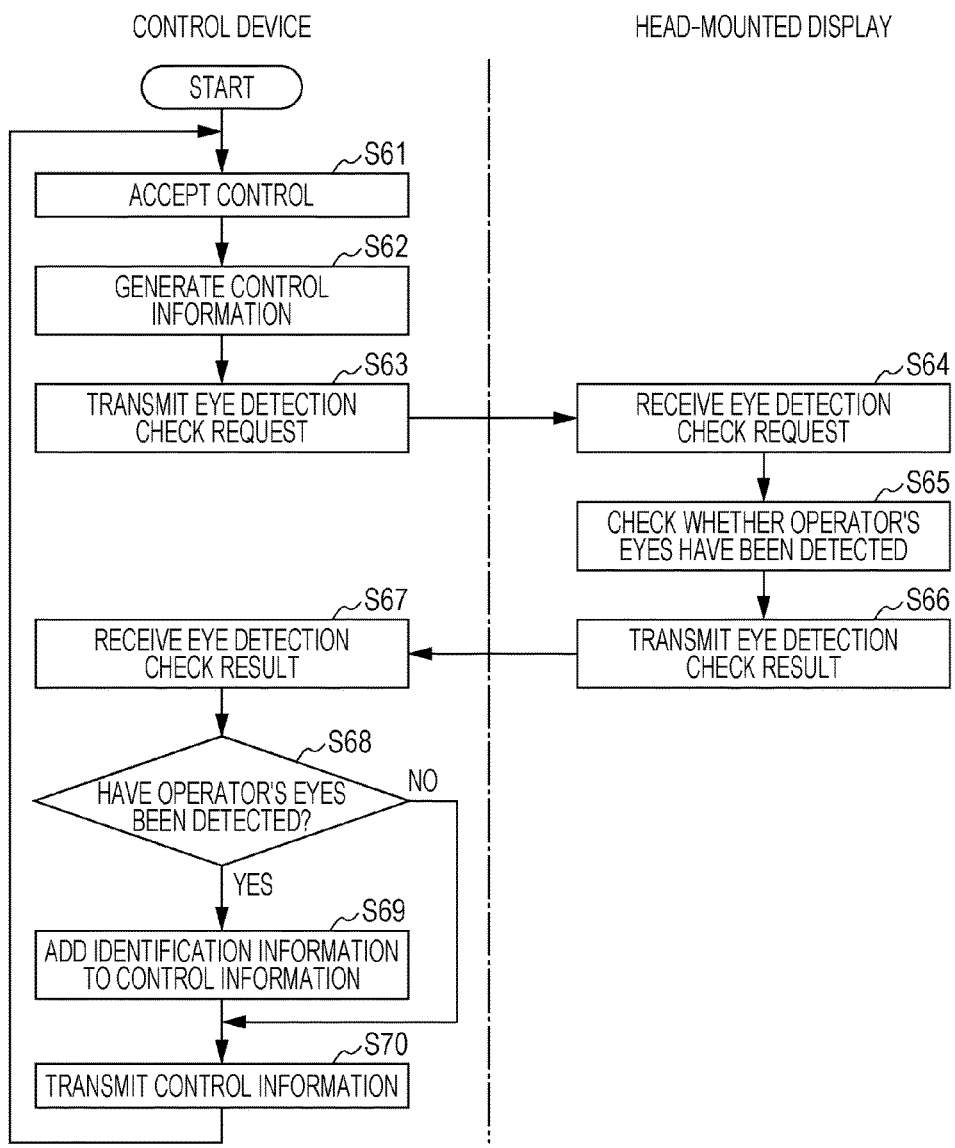
FIG. 16 is a flowchart illustrating an identification information adding process performed by a control device to add identification information to control information in the third modification of the first embodiment.

FIG. 16 is a flowchart illustrating an identification information adding process performed by the control device 2 to add identification information to control information in the third modification of the first embodiment.

First, in step S61, the operation input unit 24 accepts the control of the unmanned aerial vehicle 1 by the operator 4.

Then, in step S62, the control information generation unit 213 generates control information in accordance with the control by the operator 4, which has been accepted by the operation input unit 24.

Then, in step S63, the second communication unit 27 transmits an eye detection check request to the head-mounted display 3 to check whether the eyes of the operator 4 have been detected in the head-mounted display 3.

Then, in step S64, the second communication unit 37 of the head-mounted display 3 receives the eye detection check request transmitted from the control device 2.

Then, in step S65, the eye detection unit 38 checks whether the eyes of the operator 4 have been detected.

Then, in step S66, the second communication unit 37 transmits an eye detection check result to the unmanned aerial vehicle 1 to indicate whether the eyes of the operator 4 have been detected.

Then, in step S67, the second communication unit 27 of the control device 2 receives the eye detection check result transmitted from the head-mounted display 3.

Then, in step S68, the eye detection determination unit 216 determines whether the eyes of the operator 4 have been detected in the head-mounted display 3 on the basis of the eye detection check result received by the second communication unit 27. That is, if an eye detection check result indicating that the eyes of the operator 4 have been detected in the head-mounted display 3 is received, the eye detection determination unit 216 determines that the eyes of the operator 4 have been detected in the head-mounted display 3. If an eye detection check result indicating that the eyes of the operator 4 have not been detected in the head-mounted display 3 is received, the eye detection determination unit 216 determines that the eyes of the operator 4 have not been detected in the head-mounted display 3.

If it is determined that the eyes of the operator 4 have not been detected in the head-mounted display 3 (NO in step S68), the process proceeds to step S70.

If it is determined that the eyes of the operator 4 have been detected in the head-mounted display 3 (YES in step S68), in step S69, the identification information adding unit 214 adds identification information to the control information generated by the control information generation unit 213.

Then, in step S70, the first communication unit 26 transmits the control information to the unmanned aerial vehicle 1. If it is determined that the eyes of the operator 4 have been detected in the head-mounted display 3, the first communication unit 26 transmits the control information including the identification information to the unmanned aerial vehicle 1. If it is determined that the eyes of the operator 4 have not been detected in the head-mounted display 3, the first communication unit 26 transmits the control information including no identification information to the unmanned aerial vehicle 1.

In this way, it is possible to prevent the flight of the unmanned aerial vehicle 1 beyond the visual range when the operator is not wearing the head-mounted display 3.

Next, a flight control process according to a fourth modification of the first embodiment will be described. In the flight control process according to the fourth modification of the first embodiment, an image indicating a predetermined control instruction is superimposed on video to be transmitted from the unmanned aerial vehicle 1 to the head-mounted display 3. If the operator 4 has performed the same operation as that specified by the predetermined control instruction, it is determined that the operator 4 is wearing the head-mounted display 3 and the unmanned aerial vehicle 1 is allowed to fly beyond the visual range. Even in a case where the control information includes identification information, the unmanned aerial vehicle 1 is not allowed to fly beyond the visual range if the operator 4 has not performed the same operation as that specified by the predetermined control instruction.

An unmanned aerial vehicle 1, a control device 2, and a head-mounted display 3 according to the fourth modification of the first embodiment have substantially the same configurations as the unmanned aerial vehicle 1, the control device 2, and the head-mounted display 3 illustrated in FIG. 5, FIG. 6, and FIG. 7, respectively.

The video transmission control unit 116 measures the time that has elapsed since the unmanned aerial vehicle 1 was determined to be beyond the visual range. If a predetermined time has elapsed, the video transmission control unit 116 transmits, to the head-mounted display 3, video on which an image indicating a predetermined control instruction provided to the operator 4 is superimposed.

If control information indicating a control result corresponding to the predetermined control instruction is received from the control device 2, the flight control unit 112 controls the flight of the unmanned aerial vehicle 1 in accordance with the control information. If control information indicating the control result corresponding to the predetermined control instruction is not received from the control device 2, the flight control unit 112 does not control the flight of the unmanned aerial vehicle 1 in accordance with control information.

Figure 17:
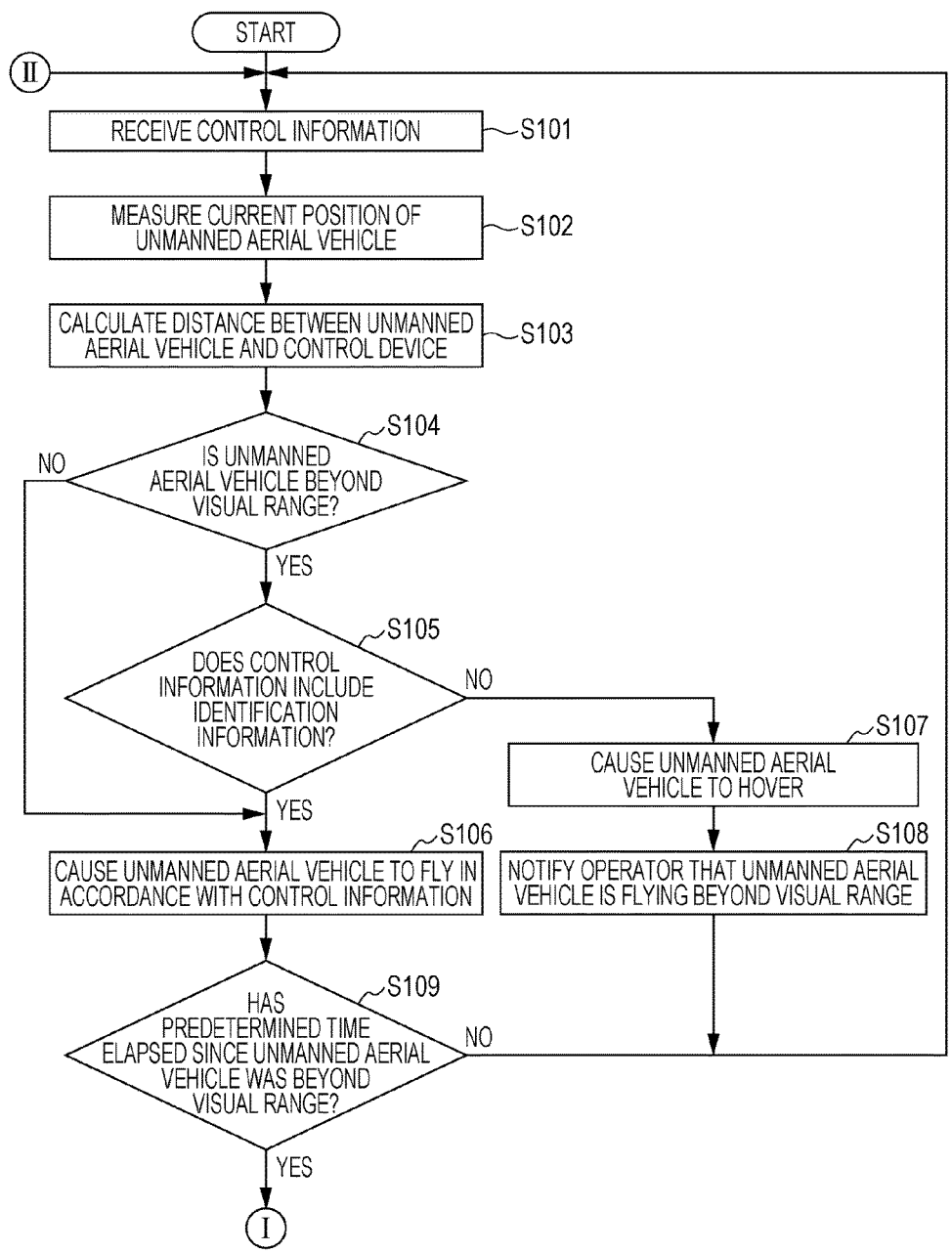
FIG. 17 is a first flowchart illustrating a process for controlling the flight of an unmanned aerial vehicle according to a fourth modification of the first embodiment.
Figure 18:
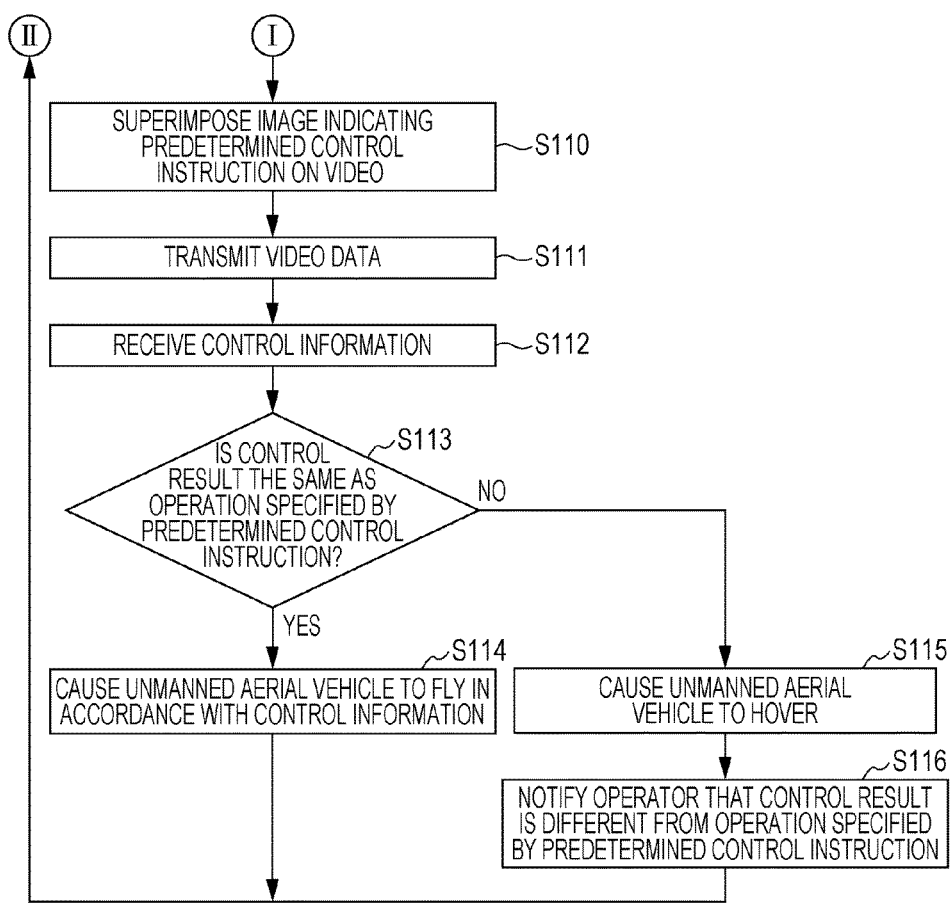
FIG. 18 is a second flowchart illustrating the process for controlling the flight of an unmanned aerial vehicle according to the fourth modification of the first embodiment.

FIG. 17 is a first flowchart illustrating a process for controlling the flight of the unmanned aerial vehicle 1 according to the fourth modification of the first embodiment, and FIG. 18 is a second flowchart illustrating the process for controlling the flight of the unmanned aerial vehicle 1 according to the fourth modification of the first embodiment.

The processing of steps S101 to S108 is substantially the same as the processing of steps S11 to S18 illustrated in FIG. 9 and is not described herein.

After the start of flight in accordance with the control information, in step S109, the video transmission control unit 116 determines whether a predetermined time has elapsed since the unmanned aerial vehicle 1 was beyond the visual range. The video transmission control unit 116 measures the time that has elapsed since the unmanned aerial vehicle 1 was beyond the visual range. If it is determined that the predetermined time has not elapsed since the unmanned aerial vehicle 1 was beyond the visual range (NO in step S109), the process returns to step S101.

If it is determined that the predetermined time has elapsed since the unmanned aerial vehicle 1 was beyond the visual range (YES in step S109), in step S110, the video transmission control unit 116 superimposes an image indicating a predetermined control instruction on video captured by the camera 14. Examples of the predetermined control instruction include an instruction for controlling the unmanned aerial vehicle 1 to turn right, an instruction for controlling the unmanned aerial vehicle 1 to turn left, an instruction for controlling the unmanned aerial vehicle 1 to fly high, and an instruction for controlling the unmanned aerial vehicle 1 to fly down.

Then, in step S111, the video transmission control unit 116 transmits, to the head-mounted display 3, video data on which the image indicating the predetermined control instruction is superimposed.

Then, in step S112, the first communication unit 17 receives the control information transmitted from the control device 2.

Then, in step S113, the flight control unit 112 determines whether the control result included in the control information is the same as the operation specified by the control instruction. If it is determined that the control result is the same as the operation specified by the control instruction (YES in step S113), in step S114, the flight control unit 112 causes the unmanned aerial vehicle 1 to fly in accordance with the control information.

If it is determined that the control result is not the same as the operation specified by the control instruction (NO in step S113), in step S115, the flight control unit 112 causes the unmanned aerial vehicle 1 to hover.

Then, in step S116, the flight control unit 112 notifies the operator 4 that the control result is different from the operation specified by the predetermined control instruction. Specifically, the flight control unit 112 transmits warning information to the control device 2 to indicate that the control result is different from the operation specified by the predetermined control instruction. Upon receipt of the warning information from the unmanned aerial vehicle 1, the control device 2 causes a warning light on the control device 2 to illuminate. The illumination of the warning light notifies the operator 4 that the control result is different from the operation specified by the predetermined control instruction, thereby prompting the operator 4 to control the unmanned aerial vehicle 1 while wearing the head-mounted display 3. If the control device 2 includes a display unit, the display unit of the control device 2 may display that the control result is different from the operation specified by the predetermined control instruction. If the control device 2 includes a speaker, the speaker of the control device 2 may output audio indicating that the control result is different from the operation specified by the predetermined control instruction. Additionally, the flight control unit 112 may transmit the warning information to a pre-registered terminal device possessed by the operator 4. In this case, a display unit of the terminal device displays that the control result is different from the operation specified by the predetermined control instruction.

In this way, it is possible to check whether the operator is wearing the head-mounted display 3 by determining whether the operator is controlling the unmanned aerial vehicle 1 in accordance with a predetermined control instruction provided to the operator. Thus, it is possible to prevent the flight of the unmanned aerial vehicle 1 beyond the visual range when the operator is not wearing the head-mounted display 3.

Next, a flight control process according to a fifth modification of the first embodiment will be described. In the flight control process according to the fifth modification of the first embodiment, if pairing has been established between the unmanned aerial vehicle 1 and the head-mounted display 3, the unmanned aerial vehicle 1 is allowed to fly beyond the visual range. If pairing has not been established between the unmanned aerial vehicle 1 and the head-mounted display 3, the unmanned aerial vehicle 1 is not allowed to fly beyond the visual range.

Figure 19:
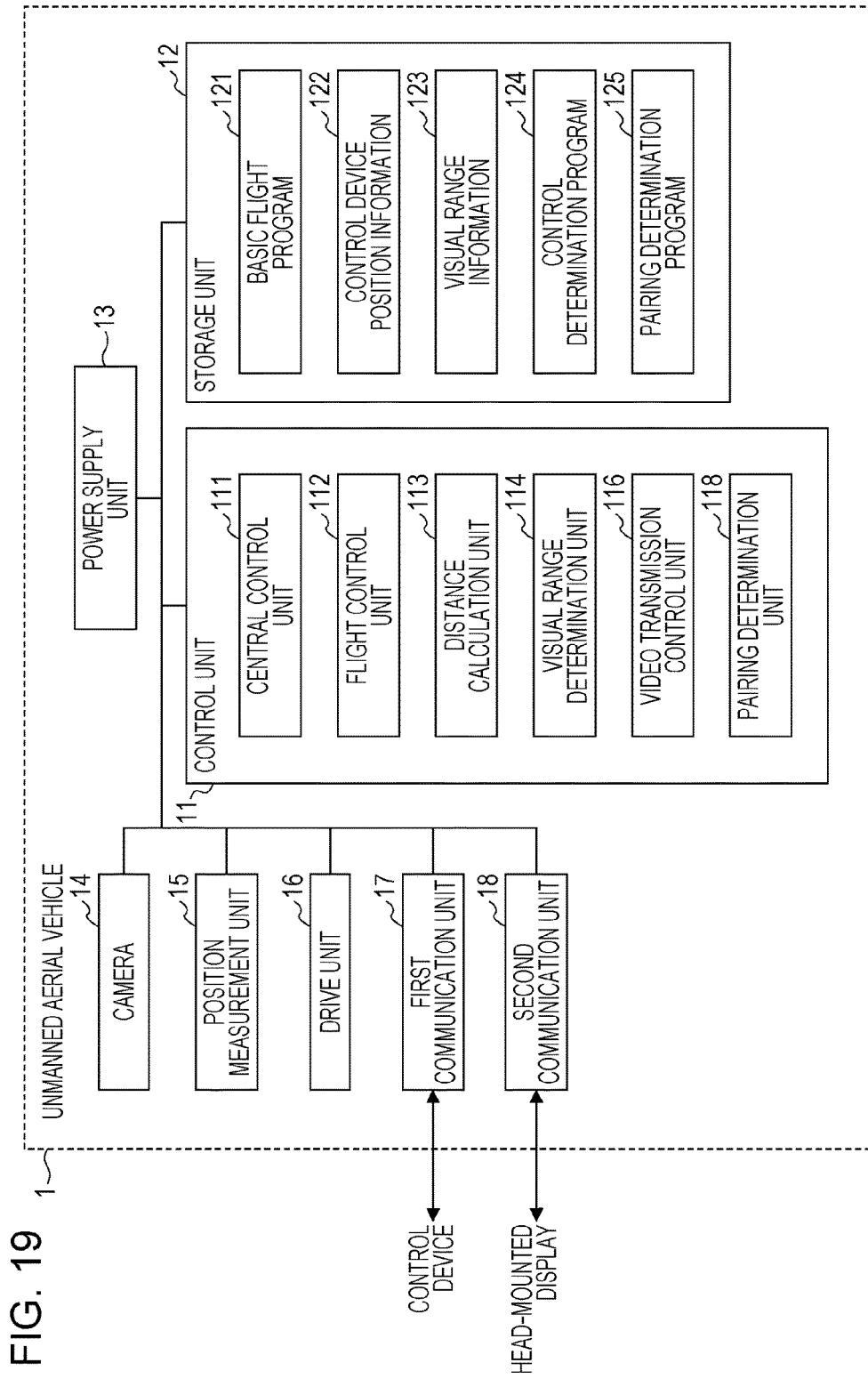
FIG. 19 is a block diagram illustrating the configuration of an unmanned aerial vehicle according to a fifth modification of the first embodiment.

FIG. 19 is a block diagram illustrating the configuration of an unmanned aerial vehicle 1 according to the fifth modification of the first embodiment. The unmanned aerial vehicle 1 illustrated in FIG. 19 includes a control unit 11, a storage unit 12, a power supply unit 13, a camera 14, a position measurement unit 15, a drive unit 16, a first communication unit 17, and a second communication unit 18. The control unit 11 includes a central control unit 111, a flight control unit 112, a distance calculation unit 113, a visual range determination unit 114, a video transmission control unit 116, and a pairing determination unit 118. The storage unit 12 stores a basic flight program 121, control device position information 122, visual range information 123, a control determination program 124, and a pairing determination program 125.

In the unmanned aerial vehicle 1 according to the fifth modification of the first embodiment illustrated in FIG. 19, substantially the same components as those of the unmanned aerial vehicle 1 illustrated in FIG. 5 are identified with the same numerals and are not described herein. A control device 2 and a head-mounted display 3 according to the fifth modification of the first embodiment have substantially the same configurations as the control device 2 and the head-mounted display 3 illustrated in FIG. 6 and FIG. 7, respectively.

The pairing determination unit 118 determines whether pairing has been established between the unmanned aerial vehicle 1 and the head-mounted display 3. The pairing determination program 125 is a program for determining whether pairing has been established between the unmanned aerial vehicle 1 and the head-mounted display 3. The pairing determination unit 118 executes the pairing determination program 125 to determine whether pairing has been established between the unmanned aerial vehicle 1 and the head-mounted display 3.

If it is determined that pairing has been established between the unmanned aerial vehicle 1 and the head-mounted display 3, the flight control unit 112 controls the flight of the unmanned aerial vehicle 1 in accordance with the control information. If it is determined that pairing has not been established between the unmanned aerial vehicle 1 and the head-mounted display 3, the flight control unit 112 does not control the flight of the unmanned aerial vehicle 1 in accordance with the control information.

If a communication connection has been established between the unmanned aerial vehicle 1 and the head-mounted display 3, the pairing determination unit 118 determines that pairing has been established between the unmanned aerial vehicle 1 and the head-mounted display 3. That is, the pairing determination unit 118 determines whether a communication connection has been established between the unmanned aerial vehicle 1 and the head-mounted display 3. If it is determined that a communication connection has been established between the unmanned aerial vehicle 1 and the head-mounted display 3, the pairing determination unit 118 determines that pairing has been established between the unmanned aerial vehicle 1 and the head-mounted display 3. If it is determined that no communication connection has been established between the unmanned aerial vehicle 1 and the head-mounted display 3, the pairing determination unit 118 determines that pairing has not been established between the unmanned aerial vehicle 1 and the head-mounted display 3. For example, the second communication unit 18 of the unmanned aerial vehicle 1 transmits a request signal to the head-mounted display 3 to establish a communication connection and receives a response signal from the head-mounted display 3 in response to the request signal. Accordingly, a communication connection is established between the unmanned aerial vehicle 1 and the head-mounted display 3.

The storage unit 12 may store in advance a device ID (specific information used for authentication) for identifying the head-mounted display 3. The second communication unit 18 may receive a device ID (specific information) from the head-mounted display 3. If match is found between the received device ID and the stored device ID, the pairing determination unit 118 may determine that pairing has been established between the unmanned aerial vehicle 1 and the head-mounted display 3. That is, the pairing determination unit 118 may determine whether match is found between the received device ID and the stored device ID. If it is determined that match is found between the received device ID and the stored device ID, the pairing determination unit 118 may determine that pairing has been established between the unmanned aerial vehicle 1 and the head-mounted display 3. If it is determined that no match is found between the received device ID and the stored device ID, the pairing determination unit 118 may determine that pairing has not been established between the unmanned aerial vehicle 1 and the head-mounted display 3.

The pairing determination unit 118 may further determine whether video is being transmitted from the unmanned aerial vehicle 1 to the head-mounted display 3. If it is determined that video is being transmitted from the unmanned aerial vehicle 1 to the head-mounted display 3, the pairing determination unit 118 may determine that pairing has been established between the unmanned aerial vehicle 1 and the head-mounted display 3. That is, the pairing determination unit 118 may determine whether video is being transmitted from the unmanned aerial vehicle 1 to the head-mounted display 3. If it is determined that video is being transmitted from the unmanned aerial vehicle 1 to the head-mounted display 3, the pairing determination unit 118 may determine that pairing has been established between the unmanned aerial vehicle 1 and the head-mounted display 3. If it is determined that video is not being transmitted from the unmanned aerial vehicle 1 to the head-mounted display 3, the pairing determination unit 118 may determine that pairing has not been established between the unmanned aerial vehicle 1 and the head-mounted display 3.

Figure 20:
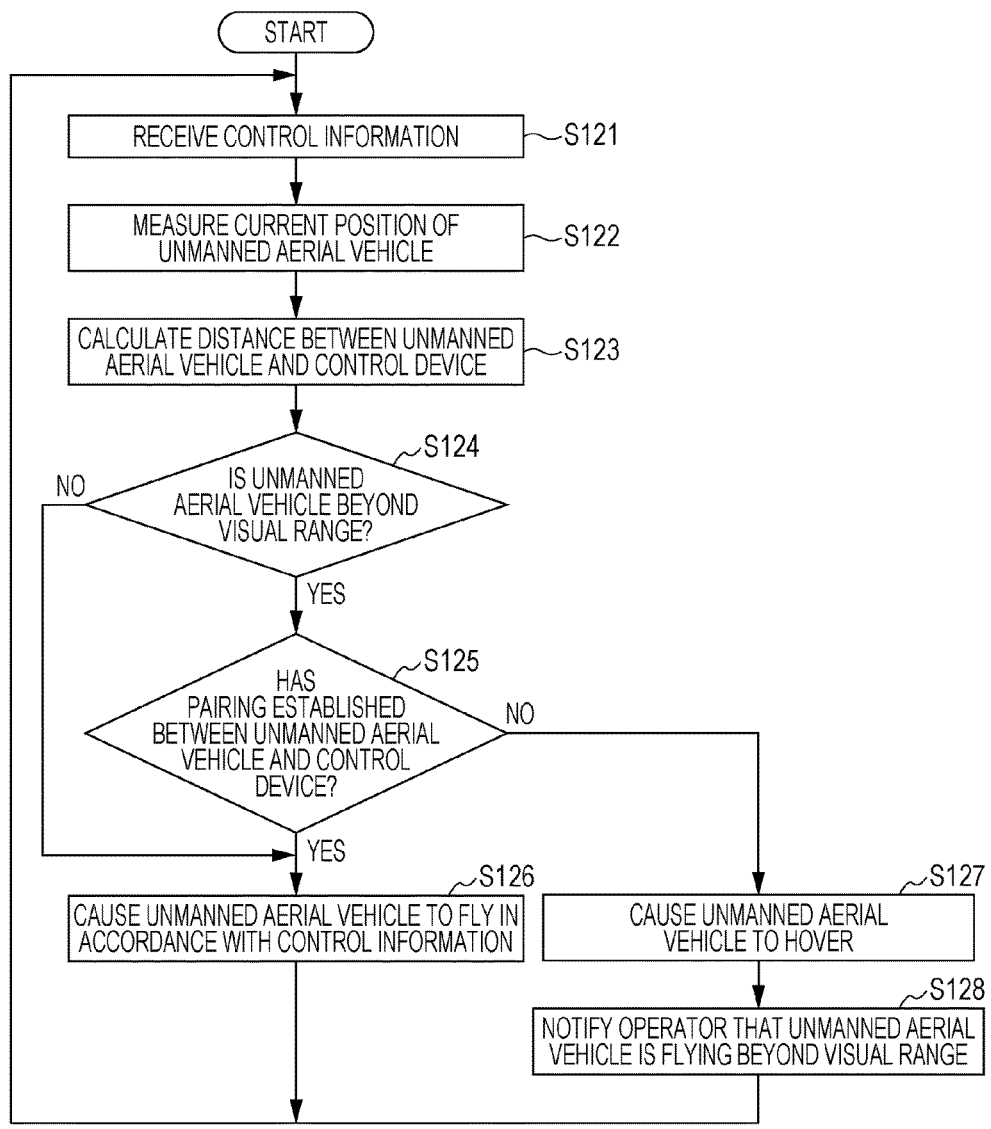
FIG. 20 is a flowchart illustrating a process for controlling the flight of an unmanned aerial vehicle according to the fifth modification of the first embodiment.

FIG. 20 is a flowchart illustrating a process for controlling the flight of the unmanned aerial vehicle 1 according to the fifth modification of the first embodiment.

The processing of steps S121 to S124 is substantially the same as the processing of steps S11 to S14 illustrated in FIG. 9 and is not described herein.

If it is determined that the unmanned aerial vehicle 1 is beyond the visual range (YES in step S124), in step S125, the pairing determination unit 118 determines whether pairing has been established between the unmanned aerial vehicle 1 and the head-mounted display 3.

If it is determined that pairing has been established between the unmanned aerial vehicle 1 and the head-mounted display 3 (YES in step S125), in step S126, the flight control unit 112 causes the unmanned aerial vehicle 1 to fly in accordance with the control information.

If it is determined that pairing has not been established between the unmanned aerial vehicle 1 and the head-mounted display 3 (NO in step S125), in step S127, the flight control unit 112 causes the unmanned aerial vehicle 1 to hover.

The processing of step S128 is substantially the same as the processing of step S18 illustrated in FIG. 9 and is not described herein.

In this way, if pairing has been established between the unmanned aerial vehicle 1 and the head-mounted display 3, the operator is determined to be controlling the unmanned aerial vehicle 1 by using the control device 2 while viewing video displayed on the head-mounted display 3, and the unmanned aerial vehicle 1 can be allowed to fly beyond the visual range. If pairing has not been established between the unmanned aerial vehicle 1 and the head-mounted display 3, the operator is determined not to be controlling the unmanned aerial vehicle 1 by using the control device 2 while viewing video displayed on the head-mounted display 3, and the unmanned aerial vehicle 1 can be forbidden from flying beyond the visual range prohibited.

In the fifth modification of the first embodiment, if the unmanned aerial vehicle 1 is beyond the visual range, it is determined whether pairing has been established between the unmanned aerial vehicle 1 and the head-mounted display 3. However, the present disclosure is not limited to this operation. The unmanned aerial vehicle 1 may include a control determination unit. If it is determined that the unmanned aerial vehicle 1 is beyond the visual range, the control determination unit may determine whether the control information includes identification information. If it is determined that the control information includes identification information, the flight control unit 112 may cause the unmanned aerial vehicle 1 to fly in accordance with the control information. If it is determined that the control information includes no identification information, the pairing determination unit 118 may determine whether pairing has been established between the unmanned aerial vehicle 1 and the head-mounted display 3. If it is determined that pairing has been established between the unmanned aerial vehicle 1 and the head-mounted display 3, the flight control unit 112 may cause the unmanned aerial vehicle 1 to fly in accordance with the control information. If it is determined that pairing has not been established between the unmanned aerial vehicle 1 and the head-mounted display 3, the flight control unit 112 may cause the unmanned aerial vehicle 1 to hover without controlling the flight of the unmanned aerial vehicle 1 in accordance with the control information.

Second Embodiment

A flight control system according to a second embodiment of the present disclosure will be described. In the second embodiment of the present disclosure, an operator who is to control the unmanned aerial vehicle 1 by using the control device 2 while viewing video displayed on the head-mounted display 3 is required to be certified by a predetermined organization. An operator who is permitted to control the unmanned aerial vehicle 1 by using the control device 2 while viewing video displayed on the head-mounted display 3 is issued with a license ID in advance. The control device 2 receives a license ID input by an operator. If the input license ID is authentic, identification information indicating that the operator is controlling the unmanned aerial vehicle 1 by using the control device 2 while viewing video displayed on the head-mounted display 3 is added to control information.

Figure 21:
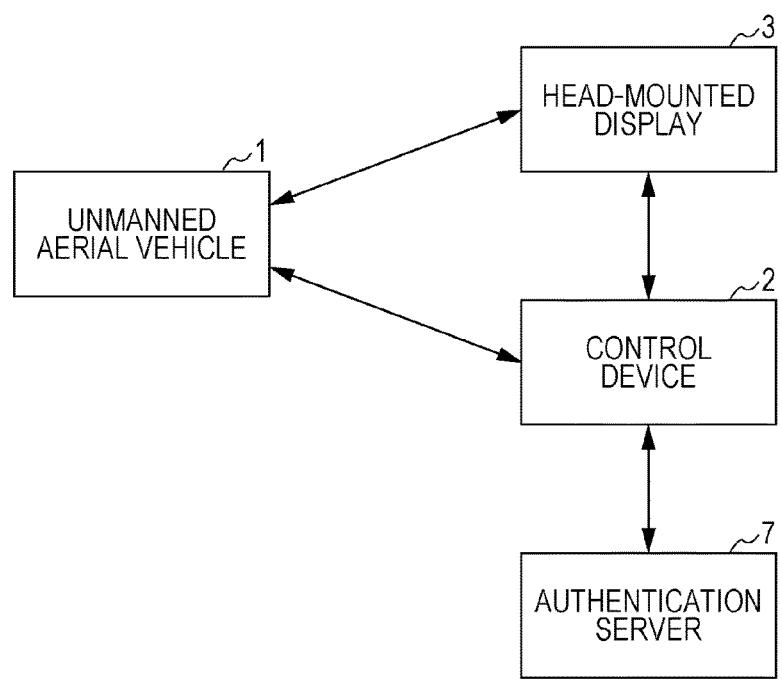
FIG. 21 is a block diagram illustrating the configuration of a flight control system according to a second embodiment of the present disclosure.

FIG. 21 is a block diagram illustrating the configuration of a flight control system according to the second embodiment of the present disclosure. The flight control system illustrated in FIG. 21 includes an unmanned aerial vehicle 1, a control device 2, a head-mounted display 3, and an authentication server 7.

The control device 2 receives a license ID (authorization information) input by an operator. A license ID is assigned (issued) in advance to an operator who is permitted to control the unmanned aerial vehicle 1 by using the control device 2 while viewing video displayed on the head-mounted display 3. The control device 2 transmits the input license ID to the authentication server 7.

The authentication server 7 receives the license ID transmitted from the control device 2 and verifies the authenticity of the received license ID. The authentication server 7 verifies whether the input license ID is a license ID (pre-authorization information) pre-assigned to the operator who would be permitted to control the unmanned aerial vehicle 1 by using the control device 2 while viewing video displayed on the head-mounted display 3. The authentication server 7 transmits authentication result information indicating a result of the verification of the authenticity of the received license ID to the control device 2. If it is determined that the input license ID is a license ID pre-assigned to the operator, the authentication server 7 transmits authentication result information to the control device 2 to indicate that the input license ID is authentic. If it is determined that the input license ID is not a license ID pre-assigned to the operator, the authentication server 7 transmits authentication result information to the control device 2 to indicate that the input license ID is not authentic.

The control device 2 acquires authentication result information indicating a result of the verification of the authenticity of the input license ID. If the acquired authentication result information indicates that the input license ID is authentic, the control device 2 adds identification information to the control information.

Figure 22:
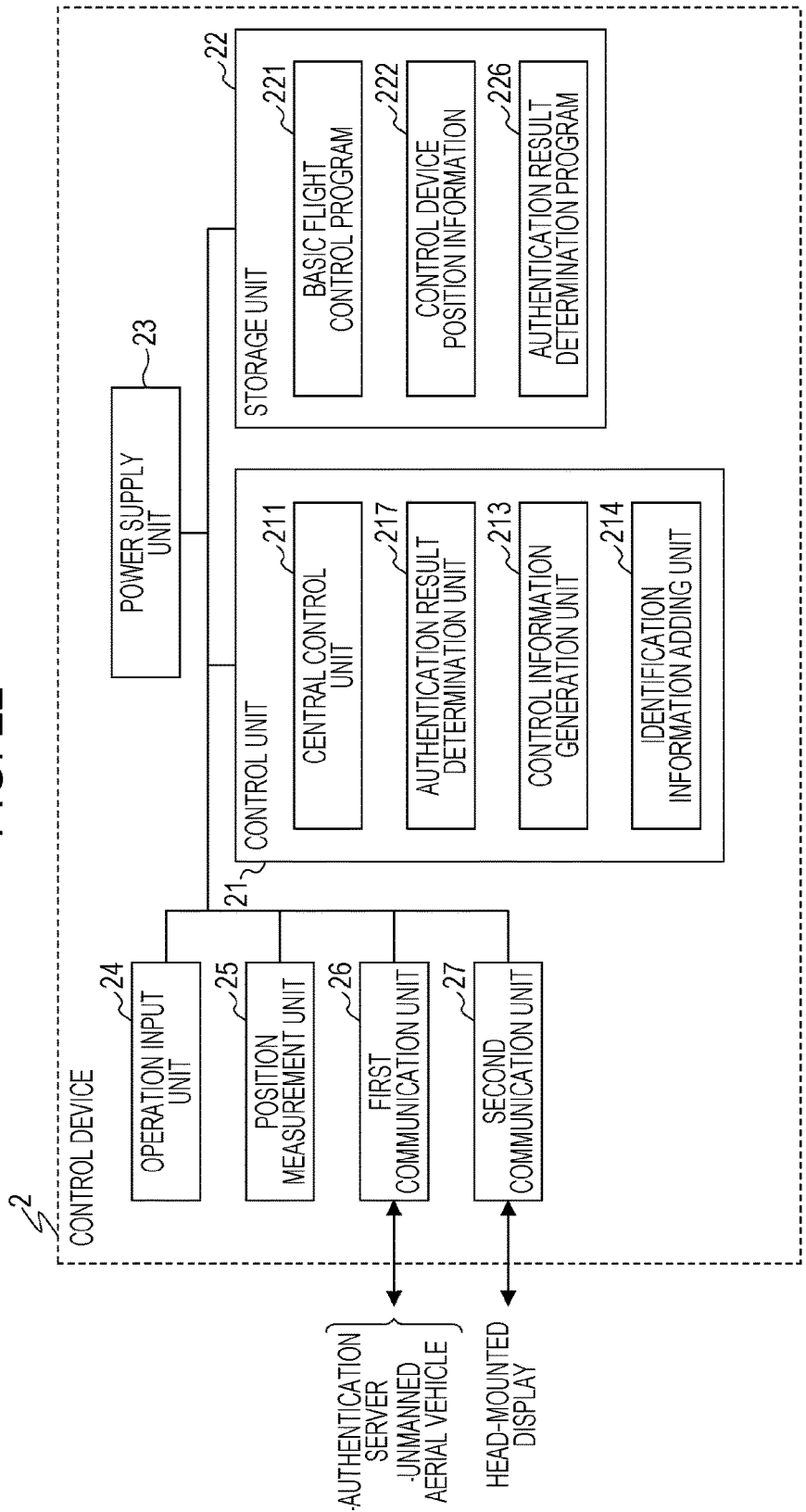
FIG. 22 is a block diagram illustrating the configuration of a control device according to the second embodiment.

FIG. 22 is a block diagram illustrating the configuration of the control device 2 according to the second embodiment. The control device 2 illustrated in FIG. 22 includes a control unit 21, a storage unit 22, a power supply unit 23, an operation input unit 24, a position measurement unit 25, a first communication unit 26, and a second communication unit 27. The control unit 21 includes a central control unit 211, a control information generation unit 213, an identification information adding unit 214, and an authentication result determination unit 217. The storage unit 22 stores a basic flight control program 221, control device position information 222, and an authentication result determination program 226.

In the control device 2 according to the second embodiment illustrated in FIG. 22, substantially the same components as those of the control device 2 illustrated in FIG. 6 are identified with the same numerals and are not described herein. The unmanned aerial vehicle 1 and the head-mounted display 3 according to the second embodiment have substantially the same configurations as the unmanned aerial vehicle 1 and the head-mounted display 3 illustrated in FIG. 5 and FIG. 7, respectively.

The operation input unit 24 receives input of a license ID pre-assigned to the operator who would be permitted to control the unmanned aerial vehicle 1 by using the control device 2 while viewing video displayed on the head-mounted display 3. The first communication unit 26 transmits the input license ID to the authentication server 7. The first communication unit 26 receives authentication result information indicating a result of the verification of the authenticity of the input license ID.

The authentication result determination unit 217 determines whether the input license ID is authentic on the basis of the authentication result information received by the first communication unit 26. The phrase "the input license ID is authentic" means that the input license ID is a license ID pre-assigned to the operator who would be permitted to control the unmanned aerial vehicle 1 by using the control device 2 while viewing video displayed on the head-mounted display 3. The authentication result information indicates whether the input license ID is authentic. The authentication result determination program 226 is a program for determining whether the input license ID is authentic. The authentication result determination unit 217 executes the authentication result determination program 226 to determine whether the input license ID is authentic.

If the authentication result determination unit 217 determines that the input license ID is authentic, the identification information adding unit 214 adds identification information to the control information.

Figure 23:
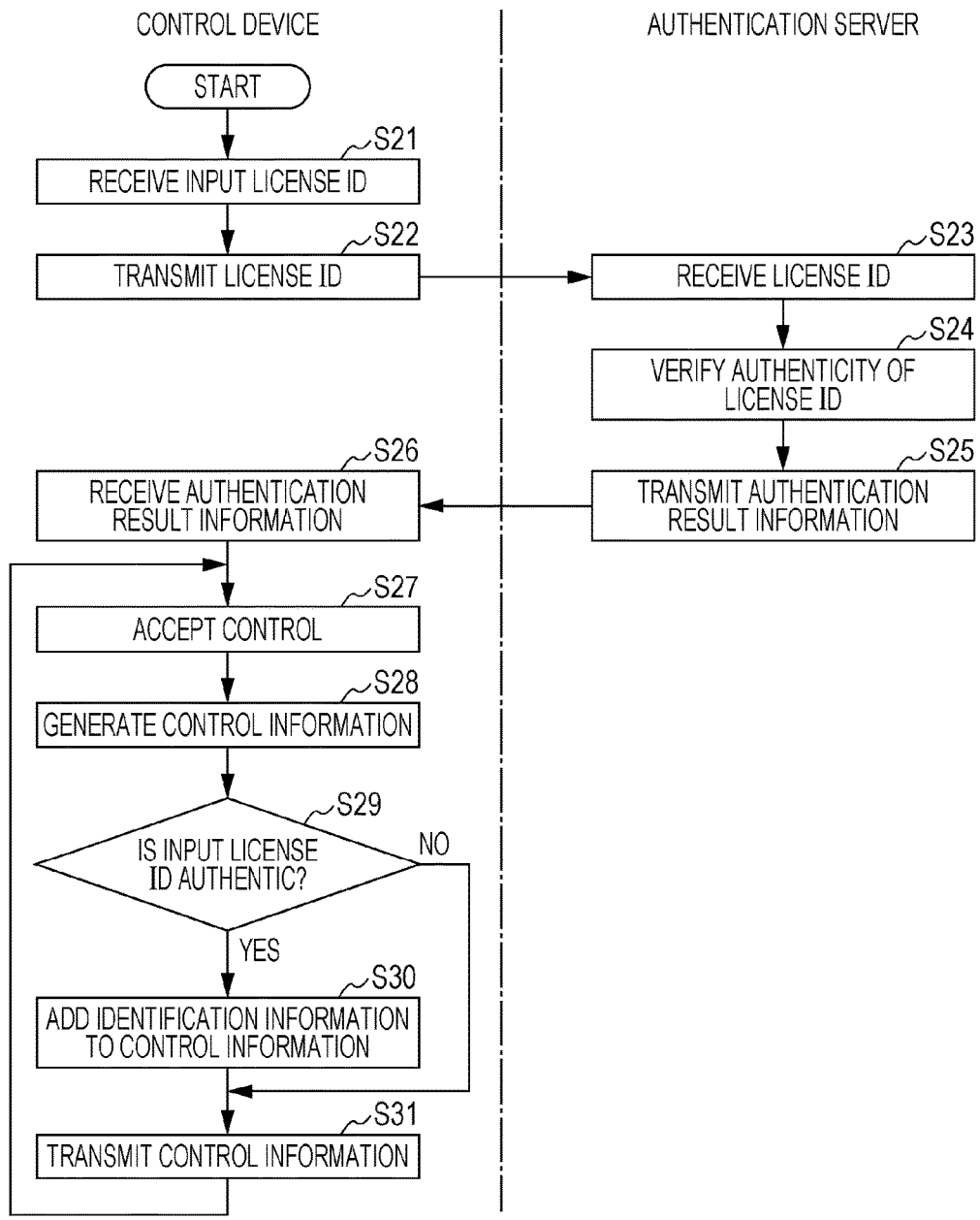
FIG. 23 is a flowchart illustrating an identification information adding process performed by a control device to add identification information to control information in the second embodiment.

FIG. 23 is a flowchart illustrating an identification information adding process performed by the control device 2 to add identification information to control information in the second embodiment.

First, in step S21, the operation input unit 24 receives a license ID input by an operator. A license ID is pre-assigned to the operator who would be permitted to control the unmanned aerial vehicle 1 by using the control device 2 while viewing video displayed on the head-mounted display 3.

Then, in step S22, the first communication unit 26 transmits the license ID input using the operation input unit 24 to the authentication server 7.

Then, in step S23, the authentication server 7 receives the license ID transmitted from the control device 2.

Then, in step S24, the authentication server 7 verifies the authenticity of the received license ID. Specifically, the authentication server 7 determines whether the received license ID matches a pre-registered license ID. If the received license ID matches a pre-registered license ID, the authentication server 7 determines that the received license ID is authentic. If the received license ID does not match any pre-registered license ID, the authentication server 7 determines that the received license ID is not authentic.

Then, in step S25, the authentication server 7 transmits authentication result information to the control device 2. The authentication result information indicates a result of the verification of the authenticity of the received license ID and indicates whether the received license ID is authentic.

Then, in step S26, the first communication unit 26 receives the authentication result information transmitted from the authentication server 7.

Then, in step S27, the operation input unit 24 accepts the control of the unmanned aerial vehicle 1 by the operator.

Then, in step S28, the control information generation unit 213 generates control information in accordance with the control by the operator, which has been accepted by the operation input unit 24.

Then, in step S29, the authentication result determination unit 217 determines whether the input license ID is authentic on the basis of the authentication result information received by the first communication unit 26. If it is determined that the input license ID is not authentic (NO in step S29), the process proceeds to step S31.

If it is determined that the input license ID is authentic (YES in step S29), in step S30, the identification information adding unit 214 adds identification information to the control information generated by the control information generation unit 213.

Then, in step S31, the first communication unit 26 transmits the control information to the unmanned aerial vehicle 1. If it is determined that the input license ID is authentic, the first communication unit 26 transmits the control information including the identification information to the unmanned aerial vehicle 1. If it is determined that the input license ID is not authentic, the first communication unit 26 transmits the control information including no identification information to the unmanned aerial vehicle 1.

A process for controlling the flight of the unmanned aerial vehicle 1 according to the second embodiment is substantially the same as the process for controlling the flight of the unmanned aerial vehicle 1 illustrated in FIG. 9 and is not described herein.

In this way, an operator who is not permitted to control the unmanned aerial vehicle 1 by using the control device 2 while viewing video displayed on the head-mounted display 3 can be forbidden from controlling the unmanned aerial vehicle 1 by using the control device 2 while viewing video displayed on the head-mounted display 3. If an operator is not permitted to control the unmanned aerial vehicle 1 by using the control device 2 while viewing video displayed on the head-mounted display 3, the unmanned aerial vehicle 1, which is controlled by the operator, can be prevented from flying beyond the visual range.

Third Embodiment

A flight control system according to a third embodiment of the present disclosure will be described. In the third embodiment of the present disclosure, an operator who is to control the unmanned aerial vehicle 1 by using the control device 2 while viewing video displayed on the head-mounted display 3 is required to be certified by a predetermined organization. An operator who is permitted to control the unmanned aerial vehicle 1 by using the control device 2 while viewing video displayed on the head-mounted display 3 is issued with a license ID in advance. The control device 2 receives a license ID input by an operator and transmits the input license ID to the unmanned aerial vehicle 1. If the received license ID is authentic, the unmanned aerial vehicle 1 determines that the operator is controlling the unmanned aerial vehicle 1 by using the control device 2 while viewing video displayed on the head-mounted display 3. In the second embodiment, the control device 2 acquires an authentication result from the authentication server 7, whereas, in the third embodiment, the unmanned aerial vehicle 1 acquires an authentication result from the authentication server 7.

Figure 24:
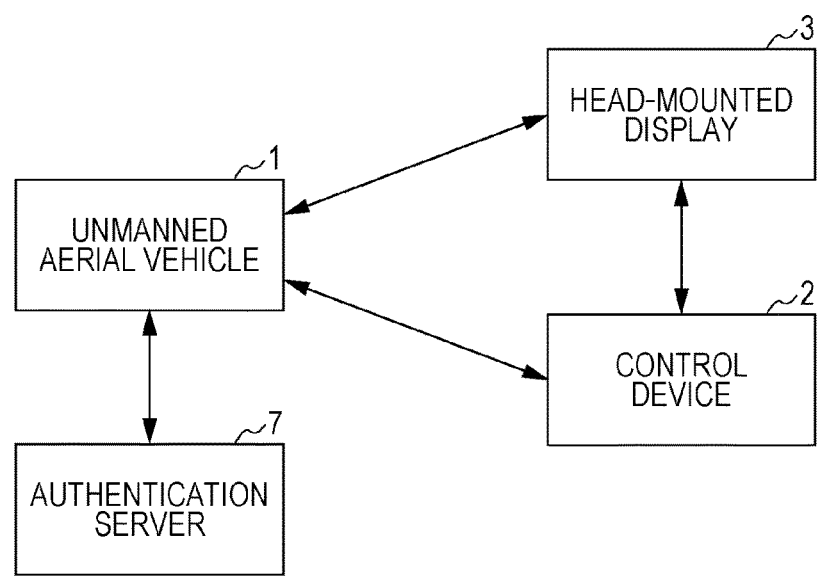
FIG. 24 is a block diagram illustrating the configuration of a flight control system according to a third embodiment of the present disclosure.

FIG. 24 is a block diagram illustrating the configuration of a flight control system according to the third embodiment of the present disclosure. The flight control system illustrated in FIG. 24 includes an unmanned aerial vehicle 1, a control device 2, a head-mounted display 3, and an authentication server 7.

The control device 2 receives a license ID (authorization information) input by an operator. A license ID is assigned (issued) in advance to an operator who is permitted to control the unmanned aerial vehicle 1 by using the control device 2 while viewing video displayed on the head-mounted display 3. The control device 2 transmits control information including the input license ID and identification information to the unmanned aerial vehicle 1.

If it is determined that the control information includes identification information, the unmanned aerial vehicle 1 determines whether the license ID input by the operator is included in the control information. If the input license ID is included in the control information, the unmanned aerial vehicle 1 transmits the license ID to the authentication server 7 in order to acquire authentication result information indicating a result of the verification of whether the input license ID is a license ID pre-assigned to the operator who would be permitted to control the unmanned aerial vehicle 1 by using the control device 2 while viewing video displayed on the head-mounted display 3.

The authentication server 7 receives the license ID transmitted from the unmanned aerial vehicle 1 and verifies the authenticity of the received license ID. The authentication server 7 verifies whether the input license ID is a license ID pre-assigned to the operator who would be permitted to control the unmanned aerial vehicle 1 by using the control device 2 while viewing video displayed on the head-mounted display 3. The authentication server 7 transmits authentication result information indicating a result of the verification of the authenticity of the received license ID to the unmanned aerial vehicle 1. If it is determined that the input license ID is a license ID pre-assigned to the operator, the authentication server 7 transmits authentication result information indicating that the input license ID is authentic to the unmanned aerial vehicle 1. If it is determined that the input license ID is not a license ID pre-assigned to the operator, the authentication server 7 transmits authentication result information indicating that the input license ID is not authentic to the unmanned aerial vehicle 1.

The unmanned aerial vehicle 1 acquires authentication result information indicating a result of the verification of the authenticity of the input license ID. If the acquired authentication result information indicates that the input license ID is authentic, that is, if the acquired authentication result information indicates that the input license ID is a license ID pre-assigned to the operator, the unmanned aerial vehicle 1 controls the flight of the unmanned aerial vehicle 1 in accordance with the control information. If the input license ID is not included in the control information or if the acquired authentication result information indicates that the license ID is not authentic, that is, if the acquired authentication result information indicates that the input license ID is not a license ID pre-assigned to the operator, the unmanned aerial vehicle 1 does not control the flight of the unmanned aerial vehicle 1 in accordance with the control information.

Figure 25:
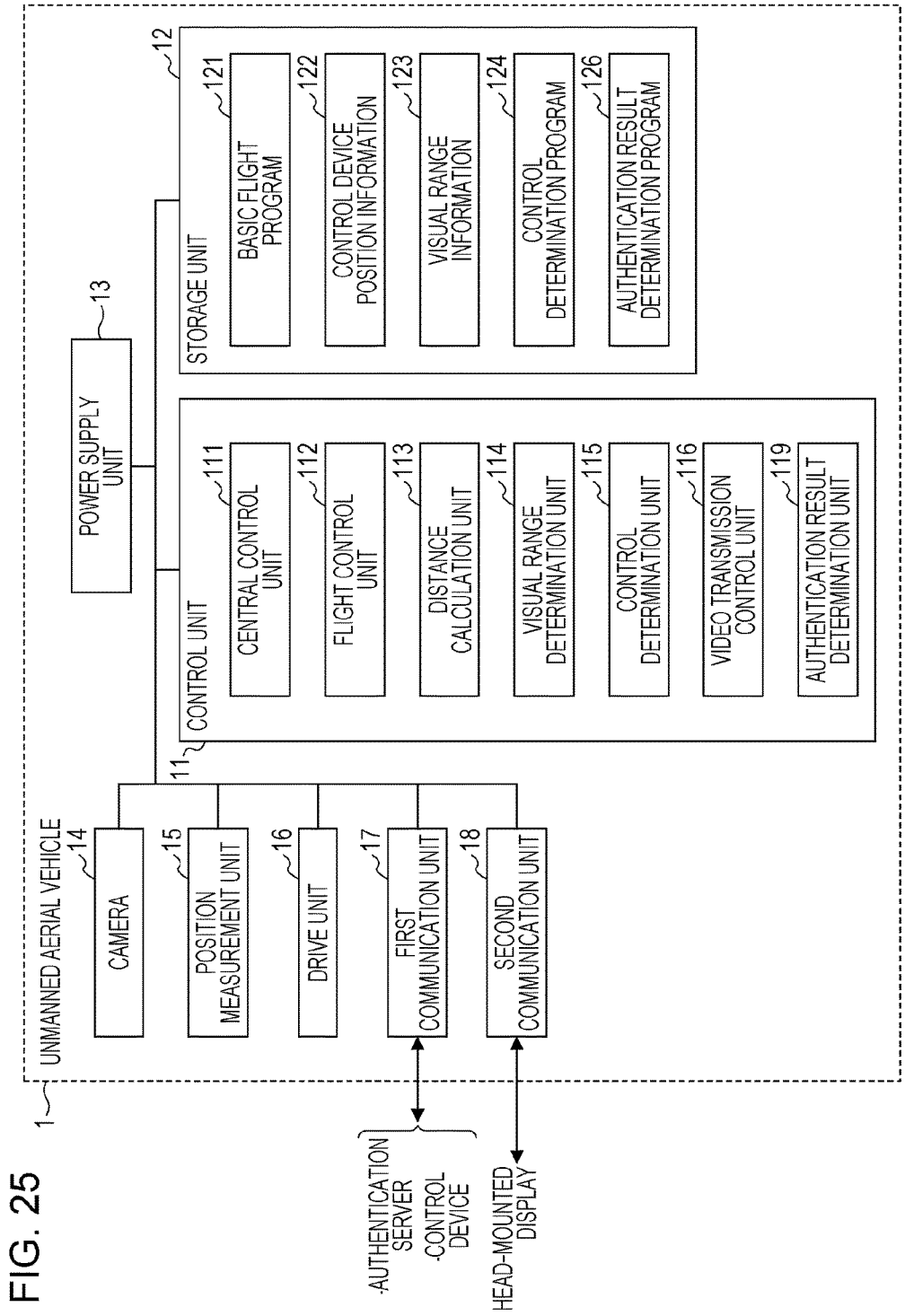
FIG. 25 is a block diagram illustrating the configuration of an unmanned aerial vehicle according to the third embodiment.

FIG. 25 is a block diagram illustrating the configuration of the unmanned aerial vehicle 1 according to the third embodiment. The unmanned aerial vehicle 1 illustrated in FIG. 25 includes a control unit 11, a storage unit 12, a power supply unit 13, a camera 14, a position measurement unit 15, a drive unit 16, a first communication unit 17, and a second communication unit 18. The control unit 11 includes a central control unit 111, a flight control unit 112, a distance calculation unit 113, a visual range determination unit 114, a control determination unit 115, a video transmission control unit 116, a video transmission determination unit 117, and an authentication result determination unit 119. The storage unit 12 stores a basic flight program 121, control device position information 122, visual range information 123, a control determination program 124, and an authentication result determination program 126.

In the unmanned aerial vehicle 1 according to the third embodiment illustrated in FIG. 25, substantially the same components as those of the unmanned aerial vehicle 1 illustrated in FIG. 5 are identified with the same numerals and are not described herein. The control device 2 and the head-mounted display 3 according to the third embodiment have substantially the same configurations as the control device 2 and the head-mounted display 3 illustrated in FIG. 6 and FIG. 7, respectively.

The operation input unit 24 of the control device 2 receives input of a license ID (authorization information) assigned (issued) in advance to an operator who is permitted to control the unmanned aerial vehicle 1 by using the control device 2 while viewing video displayed on the head-mounted display 3. If the communication connection determination unit 212 of the control device 2 determines that a communication connection has been established between the control device 2 and the head-mounted display 3, the identification information adding unit 214 adds identification information to the control information. Further, if the operation input unit 24 of the control device 2 receives input of the license ID, the identification information adding unit 214 adds the input license ID to the control information.

The first communication unit 26 of the control device 2 transmits control information including the input license ID and the identification information to the unmanned aerial vehicle 1.

If it is determined that the control information includes identification information, the authentication result determination unit 119 determines whether the control information includes a license ID pre-assigned to the operator who would be permitted to control the unmanned aerial vehicle 1 by using the control device 2 while viewing video displayed on the head-mounted display 3.

If the input license ID is included in the control information, the first communication unit 17 transmits the input license ID to the authentication server 7. The first communication unit 17 receives authentication result information indicating a result of the verification of the authenticity of the input license ID.

The authentication result determination unit 119 determines whether the input license ID is authentic on the basis of the authentication result information received by the first communication unit 17. The phrase "the input license ID is authentic" means that the input license ID is a license ID pre-assigned to the operator who would be permitted to control the unmanned aerial vehicle 1 by using the control device 2 while viewing video displayed on the head-mounted display 3. The authentication result information indicates whether the input license ID is authentic. The authentication result determination program 126 is a program for determining whether the input license ID is included in the control information and for determining whether the input license ID is authentic. The authentication result determination unit 119 executes the authentication result determination program 126 to determine whether the input license ID is included in the control information and also to determine whether the input license ID is authentic.

If the acquired authentication result information indicates that the input license ID is authentic, the flight control unit 112 controls the flight of the unmanned aerial vehicle 1 in accordance with the control information. If the input license ID is not included in the control information or if the acquired authentication result information indicates that the license ID is not authentic, the flight control unit 112 does not control the flight of the unmanned aerial vehicle 1 in accordance with the control information.

Figure 26:
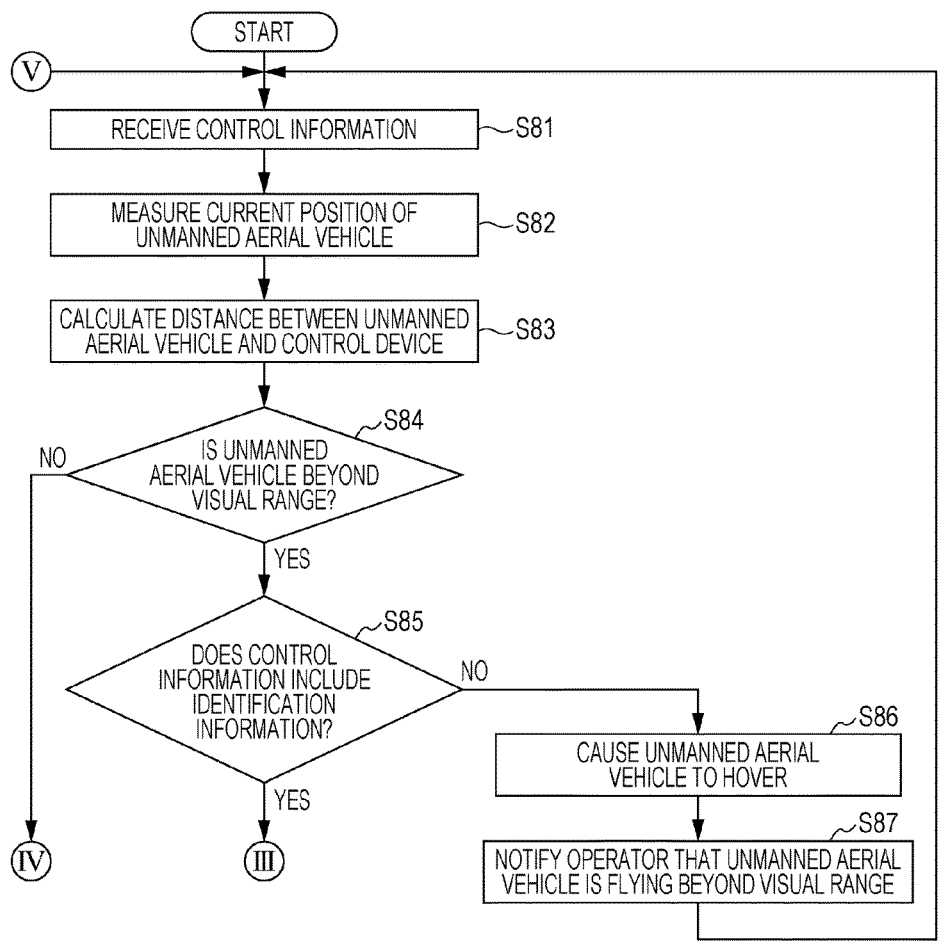
FIG. 26 is a first flowchart illustrating a process for controlling the flight of an unmanned aerial vehicle according to the third embodiment.
Figure 27:
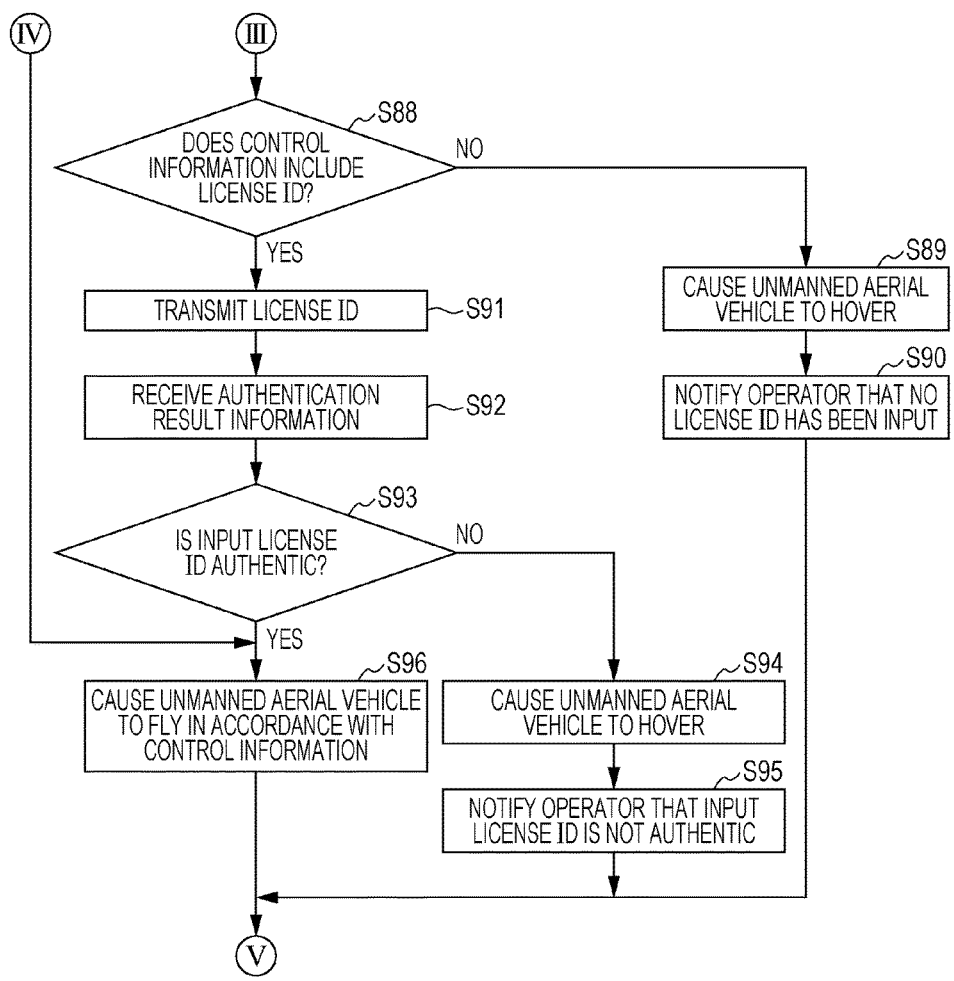
FIG. 27 is a second flowchart illustrating the process for controlling the flight of an unmanned aerial vehicle according to the third embodiment.

FIG. 26 is a first flowchart illustrating a process for controlling the flight of the unmanned aerial vehicle 1 according to the third embodiment, and FIG. 27 is a second flowchart illustrating the process for controlling the flight of the unmanned aerial vehicle 1 according to the third embodiment.

The processing of steps S81 to S87 is substantially the same as the processing of steps S11 to S15, S17, and S18 illustrated in FIG. 9 and is not described herein.

If it is determined that the control information includes identification information (YES in step S85), in step S88, the authentication result determination unit 119 determines whether the control information includes a license ID. If it is determined that the control information includes no license ID (NO in step S88), in step S89, the flight control unit 112 causes the unmanned aerial vehicle 1 to hover.

Then, in step S90, the flight control unit 112 notifies the operator that no license ID has been input. Specifically, the flight control unit 112 transmits warning information to the control device 2 to indicate that no license ID has been input. Upon receipt of the warning information from the unmanned aerial vehicle 1, the control device 2 causes a warning light on the control device 2 to illuminate. The illumination of the warning light notifies the operator that no license ID has been input. If the control device 2 includes a display unit, the display unit of the control device 2 may display that no license ID has been input. If the control device 2 includes a speaker, the speaker of the control device 2 may output audio indicating that no license ID has been input. Additionally, the flight control unit 112 may transmit the warning information to a pre-registered terminal device possessed by the operator. In this case, a display unit of the terminal device displays that no license ID has been input.

If it is determined that the control information includes a license ID (YES in step S88), in step S91, the first communication unit 17 transmits the license ID included in the control information to the authentication server 7. The process for authenticating the license ID at the authentication server 7 is substantially the same as the authentication process according to the second embodiment and is not described herein.

Then, in step S92, the first communication unit 17 receives authentication result information transmitted from the authentication server 7.

Then, in step S93, the authentication result determination unit 119 determines whether the input license ID is authentic on the basis of the authentication result information received by the first communication unit 17. If it is determined that the input license ID is not authentic (NO in step S93), in step S94, the flight control unit 112 causes the unmanned aerial vehicle 1 to hover.

Then, in step S95, the flight control unit 112 notifies the operator that the input license ID is not authentic. Specifically, the flight control unit 112 transmits warning information to the control device 2 to indicate the input license ID is not authentic. Upon receipt of the warning information from the unmanned aerial vehicle 1, the control device 2 causes a warning light on the control device 2 to illuminate. The illumination of the warning light notifies the operator that the input license ID is not authentic. If the control device 2 includes a display unit, the display unit of the control device 2 may display that the input license ID is not authentic. If the control device 2 includes a speaker, the speaker of the control device 2 may output audio indicating that the input license ID is not authentic. Additionally, the flight control unit 112 may transmit the warning information to a pre-registered terminal device possessed by the operator. In this case, a display unit of the terminal device displays that the input license ID is not authentic.

If it is determined that the input license ID is authentic (YES in step S93) or if it is determined that the unmanned aerial vehicle 1 is not beyond the visual range (NO in step S84), in step S96, the flight control unit 112 causes the unmanned aerial vehicle 1 to fly in accordance with the control information.

In this way, an operator who is not permitted to control the unmanned aerial vehicle 1 by using the control device 2 while viewing video displayed on the head-mounted display 3 can be forbidden from controlling the unmanned aerial vehicle 1 by using the control device 2 while viewing video displayed on the head-mounted display 3. If an operator is not permitted to control the unmanned aerial vehicle 1 by using the control device 2 while viewing video displayed on the head-mounted display 3, the unmanned aerial vehicle 1, which is controlled by the operator, can be prevented from flying beyond the visual range.

In the first to third embodiments, video captured by the camera 14 of the unmanned aerial vehicle 1 is displayed on the head-mounted display 3. However, the present disclosure is not limited to this configuration, and video captured by the camera 14 of the unmanned aerial vehicle 1 may be displayed on a smartphone or a tablet computer.

In the present disclosure, all or some of the units, devices, members, or portions, or all or some of the functional blocks in the block diagrams illustrated in FIGS. 5, 6, 7, 10, 12, 14, 15, 19, 22, and 25 may be implemented by one or more electronic circuits including a semiconductor device, a semiconductor integrated circuit (IC), or a large scale integration (LSI). The LSI or IC may be integrated into a single chip or may be a combination of plural chips. For example, functional blocks other than a memory element may be integrated into a single chip. The name used herein is LSI or IC, which is otherwise called system LSI, very large scale integration (VLSI), or ultra large scale integration (ULSI) depending on the degree of integration. A field programmable gate array (FPGA) that is programmable after manufacturing of an LSI or a reconfigurable logic device that allows reconfiguration of the connection or setup of circuit cells inside the LSI can be used for the same purpose.

Furthermore, all or some of the functions or operations of the units, devices, members, or portions can be implemented by executing software. In this case, the software is recorded on one or more non-transitory recording media such as a ROM, an optical disc, or a hard disk drive. When the software is executed by a processor, functions specified by the software are executed by the processor and peripheral devices. A system or a device may include one or more non-transitory recording media storing the software, a processor, and necessary hardware devices such as an interface.

An unmanned aerial vehicle, a flight control method, a non-transitory computer-readable recording medium storing a flight control program, and a control device according to embodiments of the present disclosure can prevent continuous flight of the unmanned aerial vehicle beyond a visual range within which the unmanned aerial vehicle is visible to an operator when the unmanned aerial vehicle is being controlled by the operator through visual observation, and are suitable for use as an unmanned aerial vehicle to be remotely controlled, a flight control method for controlling the flight of the unmanned aerial vehicle, a flight control program for controlling the flight of the unmanned aerial vehicle, and a control device used to remotely control the unmanned aerial vehicle.

What is claimed is:

1. An unmanned aerial vehicle comprising:
   a camera that captures video viewed from the unmanned aerial vehicle;
   a communicator that communicates with a control device used to remotely control the unmanned aerial vehicle;
   a controller; and
   a position measurer that acquires a current position of the unmanned aerial vehicle,
   wherein the controller performs operations including
      calculating a distance from the unmanned aerial vehicle to the control device,
      determining whether the unmanned aerial vehicle is beyond a visual range within which the unmanned aerial vehicle is visible to an operator on the basis of the calculated distance,
      when it is determined that the unmanned aerial vehicle is beyond the visual range, determining whether the operator is controlling the unmanned aerial vehicle by using the control device while viewing, on a display device, the video captured by the camera,
      controlling flight of the unmanned aerial vehicle in accordance with control information for controlling the unmanned aerial vehicle when it is determined that the operator is controlling the unmanned aerial vehicle by using the control device while viewing the video on the display device, and
      not controlling flight of the unmanned aerial vehicle in accordance with the control information when it is determined that the operator is not controlling the unmanned aerial vehicle by using the control device while viewing the video on the display device.

2. The unmanned aerial vehicle according to claim 1, wherein
   the operations further include
      notifying the operator that the unmanned aerial vehicle is flying beyond the visual range when it is determined that the operator is not controlling the unmanned aerial vehicle by using the control device while viewing the video on the display device.

3. The unmanned aerial vehicle according to claim 1, wherein
   when the operator is controlling the unmanned aerial vehicle by using the control device while viewing the video on the display device, identification information indicating that the operator is controlling the unmanned aerial vehicle by using the control device while viewing the video on the display device is added to the control information, and
   the operations further include
      determining whether the control information includes the identification information to determine whether the operator is controlling the unmanned aerial vehicle by using the control device while viewing the video on the display device.

4. The unmanned aerial vehicle according to claim 3, wherein the identification information is added to the control information when a communication connection has been established between the control device and the display device.

5. The unmanned aerial vehicle according to claim 3, wherein
the operations further include
when it is determined that the control information includes the identification information, determining whether authorization information input by the operator is included in the control information,
when the authorization information is included in the control information, acquiring authentication result information indicating a result of verification of whether the input authorization information is pre-authorization information pre-assigned to the operator if the operator is permitted to control the unmanned aerial vehicle by using the control device while viewing the video on the display device,
controlling flight of the unmanned aerial vehicle in accordance with the control information when the acquired authentication result information indicates that the input authorization information is the pre-authorization information, and
not controlling flight of the unmanned aerial vehicle in accordance with the control information when the authorization information is not included in the control information or when the acquired authentication result information indicates that the input authorization information is not the pre-authorization information.

6. The unmanned aerial vehicle according to claim 1, wherein
the operations further include
when it is determined that the unmanned aerial vehicle is beyond the visual range, transmitting, to the display device, video on which an image indicating a predetermined control instruction provided to the operator is superimposed,
controlling flight of the unmanned aerial vehicle in accordance with the control information when the control information indicating a control result corresponding to the predetermined control instruction is received from the control device, and
not controlling flight of the unmanned aerial vehicle in accordance with the control information when the control information indicating a control result corresponding to the predetermined control instruction is not received from the control device.

7. A flight control method comprising:
receiving control information from a control device, the control information being information for controlling an unmanned aerial vehicle;
calculating a distance from the unmanned aerial vehicle to the control device;
determining whether the unmanned aerial vehicle is beyond a visual range within which the unmanned aerial vehicle is visible to an operator on the basis of the calculated distance;
when it is determined that the unmanned aerial vehicle is beyond the visual range, determining whether the operator is controlling the unmanned aerial vehicle by using the control device while viewing video displayed on a display device, the video being video transmitted from the unmanned aerial vehicle;
controlling flight of the unmanned aerial vehicle in accordance with the control information when it is determined that the operator is controlling the unmanned aerial vehicle by using the control device while viewing the video displayed on the display device; and
not controlling flight of the unmanned aerial vehicle in accordance with the control information when it is determined that the operator is not controlling the unmanned aerial vehicle by using the control device while viewing the video displayed on the display device.

8. A non-transitory computer-readable recording medium storing a program that, when executed on a computer, causes the computer to perform a method, the method comprising:
determining whether an unmanned aerial vehicle is beyond a visual range within which the unmanned aerial vehicle is visible to an operator on the basis of a distance from the unmanned aerial vehicle to a control device;
when it is determined that the unmanned aerial vehicle is beyond the visual range, determining whether the operator is controlling the unmanned aerial vehicle by using the control device while viewing video displayed on a display device, the video being video transmitted from the unmanned aerial vehicle;
controlling flight of the unmanned aerial vehicle in accordance with control information, the control information being information for controlling the unmanned aerial vehicle, when it is determined that the operator is controlling the unmanned aerial vehicle by using the control device while viewing the video displayed on the display device; and
not controlling flight of the unmanned aerial vehicle in accordance with the control information when it is determined that the operator is not controlling the unmanned aerial vehicle by using the control device while viewing the video displayed on the display device.

9. A control device comprising:
a communicator that communicates with an unmanned aerial vehicle; and
a controller that controls an operation of the unmanned aerial vehicle,
wherein the controller performs operations including
determining whether an operator is controlling the unmanned aerial vehicle by using the control device while viewing video displayed on a display device, the video being video transmitted from the unmanned aerial vehicle, and
when it is determined that the operator is controlling the unmanned aerial vehicle by using the control device while viewing the video displayed on the display device, adding identification information to control information for controlling the unmanned aerial vehicle, the identification information being information indicating that the operator is controlling the unmanned aerial vehicle by using the control device while viewing the video displayed on the display device.

10. The control device according to claim 9, wherein the operations further include
receiving authorization information input by the operator,
acquiring authentication result information indicating a result of verification of whether the input authorization information is pre-authorization information pre-assigned to the operator if the operator is permitted to control the unmanned aerial vehicle by using the control device while viewing the video displayed on the display device, and adding the identification information to the control information when the acquired authentication result information indicates that the input authorization information is the pre-authorization information.

11. The control device according to claim 9, wherein the operations further include when it is determined that the control information includes the identification information, determining whether the video is being transmitted from the unmanned aerial vehicle to the display device, controlling flight of the unmanned aerial vehicle in accordance with the control information when it is determined that the video is being transmitted from the unmanned aerial vehicle to the display device, and not controlling flight of the unmanned aerial vehicle in accordance with the control information when it is determined that the video is not being transmitted from the unmanned aerial vehicle to the display device.

\* \* \* \* \*